United States Patent
Nakajima et al.

(10) Patent No.: US 9,836,175 B2
(45) Date of Patent: Dec. 5, 2017

(54) INPUT DEVICE, METHOD OF CONTROLLING THE SAME, AND PROGRAM

(71) Applicant: Alps Electric Co., Ltd., Tokyo (JP)

(72) Inventors: Satoshi Nakajima, Miyagi-ken (JP); Satoshi Hayasaka, Miyagi-ken (JP); Hayato Miyagawa, Miyagi-ken (JP); Kohei Kitagawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/200,482

(22) Filed: Jul. 1, 2016

(65) Prior Publication Data

US 2017/0010716 A1 Jan. 12, 2017

(30) Foreign Application Priority Data

Jul. 9, 2015 (JP) .................................. 2015-137724

(51) Int. Cl.
- *G06F 3/041* (2006.01)
- *G06F 3/033* (2013.01)
- *G06F 3/044* (2006.01)

(52) U.S. Cl.
CPC ............ *G06F 3/044* (2013.01); *G06F 3/0418* (2013.01); *G06F 2203/04101* (2013.01)

(58) Field of Classification Search
CPC . G06F 3/033; G06F 3/02; G06F 3/041; G06F 3/045; G06F 3/042; G09G 5/08; G09G 5/00; G01R 27/26; G06K 11/06; G08C 21/00

See application file for complete search history.

(56) References Cited

U.S. PATENT DOCUMENTS

| | | | | |
|---|---|---|---|---|
| 2012/0299851 A1* | 11/2012 | Homma | ................ | G06F 3/0488 345/173 |
| 2013/0120257 A1* | 5/2013 | Park | ........................ | G06F 3/041 345/158 |
| 2014/0240259 A1* | 8/2014 | Park | ...................... | G06F 3/0418 345/173 |
| 2015/0248183 A1* | 9/2015 | Schwartz | ................ | G06F 3/044 345/174 |
| 2017/0040029 A1* | 2/2017 | Ebenezer | ............. | H04R 1/1083 |

FOREIGN PATENT DOCUMENTS

| | | |
|---|---|---|
| JP | 2009-258903 | 11/2009 |
| WO | 2012/117437 | 9/2012 |

\* cited by examiner

*Primary Examiner* — Pegeman Karimi
(74) *Attorney, Agent, or Firm* — Beyer Law Group LLP

(57) ABSTRACT

A series of degree-of-approach data of the same object generated over a plurality of cycles of a detection operation is averaged in filter processing of the filter processing unit, and accordingly, the degree-of-approach data after averaging is acquired. Therefore, even in a case in which the degree-of-approach data is temporarily greatly changed due to an influence of noise, such a temporary change in the degree-of-approach data after averaging is suppressed. Further, response characteristics of a filter in the filter processing of the filter unit are changed according to a noise level which is detected by a noise detection unit. Accordingly, since appropriate filter processing according to the noise level is performed on the degree-of-approach data, the degree-of-approach data in which the influence of noise is effectively reduced is obtained.

15 Claims, 13 Drawing Sheets

INPUT DEVICE, METHOD OF CONTROLLING THE SAME, AND PROGRAM

CLAIM OF PRIORITY

This application claims benefit of Japanese Patent Application No. 2015-137724 filed on Jul. 9, 2015, which is hereby incorporated by reference.

BACKGROUND OF THE INVENTION

1. Field of the Invention

The present invention relates to an input device that inputs information according an approach state of an object using a change in capacitance or the like, a method of controlling the input device, and a program and, particularly, to an input device that inputs information according to an operation of a finger, a pen, or the like in various information devices such as a computer.

2. Description of the Related Art

Since a sensor that detects a change in capacitance can detect the approach of an object (for example, a finger or a pen) with a simple configuration, the sensor is widely used for user interface devices of various electronic devices, such as touch pads of notebook type computers or touch panels of smart phones.

In International Publication No. WO 2012/117437, a touch panel device including a touch panel unit in which a plurality of electrodes are arranged is described. A scan electrode is determined from among the plurality of electrodes of the touch panel unit, and the touch panel unit is operated for the determined scanning electrode. Accordingly, a measurement value reflecting a change in capacitance of each electrode is acquired, and it is detected whether the touch panel unit is touched based on the acquired measurement value.

However, since such an input device is required to sensitively detect the approach of an object a detection surface of a sensor, there is a problem in that the sensor is particularly susceptible to external electromagnetic noise. For example, in the case of the above-described capacitive sensor, since a change in capacitance of an electrode caused by the approach of an object is detected as a small change in the amount of charge, there is a problem in that erroneous detection of coordinates or a contact state of an object easily occurs due to an influence of noise.

In the input device, it is desirable to reduce the influence of noise as much as possible, but it is not easy to minimize the influence of noise in a detection step. On the other hand, there is a certain range of prediction of data that is acquired by the sensor. For example, since a position of a finger moves to draw a certain trajectory, it is difficult for a trajectory of the finger to be considered in a case in which an extreme change is drawn. Based on this tendency of the data, it is required to reduce the influence of noise.

SUMMARY OF THE INVENTION

The present invention provides an input device capable of preventing information according to a state of approach of an object to a detection surface from being input incorrectly due to an influence of noise, a method of controlling the input device, and a program.

A sensor input device according to a first aspect of the present invention is an input device that inputs information according to a state of approach of an object to a detection surface, the input device including: a sensor unit configured to detect a degree of approach of the object at a plurality of positions of the detection surface; a sensor control unit configured to control the sensor unit so that the sensor unit performs a periodic detection operation of detecting a degree of approach of the object at the plurality of positions in each cycle; a coordinate/degree-of-approach data generation unit configured to generate coordinate data indicating coordinates of a position of the same object approaching the detection surface and degree-of-approach data indicating the degree of approach at the coordinates over a plurality of cycles of the detection operation on the basis of a result of the detection of the sensor unit in each cycle of the detection operation; a noise detection unit configured to detect noise included in a result of the detection of the sensor unit; and a filter processing unit configured to perform processing of a predetermined filter that averages a series of degree-of-approach data of the same object that is generated over a plurality of cycles of the detection operation, in each cycle of the detection operation, and acquire a result of filter processing as degree-of-approach data after averaging. The filter processing unit changes response characteristics of the filter according to a level of the noise detected in the noise detection unit.

According to the configuration, a series of the degree-of-approach data of the same object generated over a plurality of cycles of the detection operation is averaged in the filter processing, and accordingly, the degree-of-approach data after averaging is obtained. Therefore, even in a case in which the degree-of-approach data is temporarily greatly changed due to an influence of noise, such a temporary change in the degree-of-approach data after averaging is suppressed. Accordingly, a temporary change in the value due to the influence of noise is suppressed, and stable degree-of-approach data is obtained. Further, according to the above configuration, the response characteristics of the filter in the filter processing are changed according to the level of noise detected in the noise detection unit. Accordingly, since appropriate filter processing according to the level of the noise is performed on the degree-of-approach data, the degree-of-approach data in which the influence of noise is more effectively reduced is obtained.

Preferably, the filter processing unit may slow a temporal response of the filter when a level of noise detected in the noise detection unit increases.

According to the above configuration, since the temporally sudden change in the degree-of-approach data is more effectively suppressed by the temporal response of the filter being slow in a case in which the level of noise increases, the degree-of-approach data is hardly changed due to an influence of noise. Further, since a temporally sudden change in the degree-of-approach data is easily captured by the temporal response of the filter being relatively fast in a case in which the level of noise is low, accurate degree-of-approach data according to a motion of the object approaching the detection surface is obtained even in a case in which the motion of the object approaching the detection surface is fast.

Preferably, the input device according to the first aspect may include an approach determination unit configured to compare the degree-of-approach data after averaging of each object with a threshold value in each cycle of the detection operation, and determine, for each object, whether the object approaches the detection surface on the basis of a result of the comparison. The filter processing unit may change response characteristics of the filter according to the number of objects determined to approach the detection surface in the approach determination unit.

According to the above configuration, the response characteristics of the filter are changed according to the number of objects determined to approach the detection surface. Therefore, it can be selected whether to facilitate suppression of the sudden change in the degree-of-approach data due to noise by slowing the temporal response of the filter or facilitate capturing of a fast change in the degree-of-approach data by speeding up the temporal response of the filter, according to the number of objects approaching the detection surface. That is, it is possible to appropriately set a tradeoff between noise removal performance of the filter processing and a response speed of the degree-of-approach data according to the number of objects approaching the detection surface.

Preferably, the filter processing unit may slow a temporal response of the filter when the number of objects determined to approach the detection surface by the approach determination unit is greater than 1 as compared with a case in which the number of the objects is equal to or smaller than 1.

According to the above configuration, in a case in which the number of objects approaching the detection surface is equal to or smaller than 1, a temporal response of the filter becomes relatively fast and a fast change in the degree-of-approach data is easily captured. In a case in which the number of objects approaching the detection surface is greater than 1, the temporal response of the filter becomes relatively slow and a sudden change in the degree-of-approach data due to noise is easily suppressed.

For example, in a case in which the object approaching the detection surface is an operating body such as a finger, when the number of operating bodies approaching the detection surface is 1, it becomes easy to input accurate information according to the input operation even when a relatively faster input operation is performed by one operating body since the fast change in the degree-of-approach data is easily acquired. On the other hand, when the number of operating bodies approaching the detection surface is plural, it also becomes easy to accurately input information according to the input operation using a plurality of operating bodies even in a noisy environment since the sudden change in the degree-of-approach data due to noise is easily suppressed.

Preferably, the filter processing unit may acquire a value obtained by multiplying the degree-of-approach data after averaging in a previous cycle and the degree-of-approach data generated by the coordinate/degree-of-approach data generation unit in a current cycle by respective weighting coefficients and summing the resultant degree-of-approach data, as the degree-of-approach data after averaging in the current cycle.

According to the configuration, since the degree-of-approach data after averaging in the current cycle is obtained using the degree-of-approach data after averaging in a previous cycle and the weighting coefficient, data to be stored in order to obtain the degree-of-approach data after averaging is less and a calculation process is simplified.

An input device according to a second aspect of the present invention is an input device that inputs information according to a state of approach of an object to a detection surface, the input device including: a sensor unit configured to detect a degree of approach of the object at a plurality of positions of the detection surface; a sensor control unit configured to control the sensor unit so that the sensor unit performs a periodic detection operation of detecting a degree of approach of the object at the plurality of positions in each cycle; a coordinate/degree-of-approach data generation unit configured to generate coordinate data indicating coordinates of a position of the same object approaching the detection surface and degree-of-approach data indicating the degree of approach at the coordinates over a plurality of cycles of the detection operation on the basis of a result of the detection of the sensor unit in each cycle of the detection operation; a noise detection unit configured to detect noise included in a result of the detection of the sensor unit; and a filter processing unit configured to perform predetermined filter processing of averaging a series of coordinate data of the same object that is generated over a plurality of cycles of the detection operation, in each cycle of the detection operation, and acquire a result of the filter processing as coordinate data after averaging. The filter processing unit changes response characteristics of the filter processing according to a level of the noise detected in the noise detection unit.

According to the configuration, a series of the coordinate data of the same object generated over a plurality of cycles of the detection operation is averaged in the filter processing, and accordingly, the coordinate data after averaging is obtained. Therefore, even in a case in which the coordinate data is temporarily greatly changed due to an influence of noise, such a temporary change in the coordinate data after averaging is suppressed. Accordingly, a temporary change in the value due to the influence of noise is suppressed, and stable coordinate data is obtained. Further, according to the above configuration, the response characteristics of the filter in the filter processing are changed according to the level of noise detected in the noise detection unit. Accordingly, since appropriate filter processing according to the level of the noise is performed on the coordinate data, the coordinate data in which the influence of noise is more effectively reduced is obtained.

Preferably, the filter processing unit may slow a temporal response of the filter when a level of noise detected in the noise detection unit increases.

According to the above configuration, since the temporally sudden change in the coordinate data is more effectively suppressed by the temporal response of the filter being slow in a case in which the level of noise increases, the coordinate data is hardly changed due to an influence of noise. Further, since a temporally sudden change in the coordinate data is easily captured by the temporal response of the filter being relatively fast in a case in which the level of noise is low, accurate degree-of-approach data according to a motion of the object approaching the detection surface is obtained even in a case in which the motion of the object approaching the detection surface is fast.

Preferably, the input device according to the second aspect may further include an approach determination unit configured to compare the degree-of-approach data of each object with a threshold value in each cycle of the detection operation, and determine, for each object, whether the object approaches the detection surface on the basis of a result of the comparison. The filter processing unit may change response characteristics of the filter according to the number of objects determined to approach the detection surface in the approach determination unit.

According to the above configuration, the response characteristics of the filter are changed according to the number of objects determined to approach the detection surface. Therefore, it can be selected whether to facilitate suppression of the sudden change in the coordinate data due to noise by slowing the temporal response of the filter or facilitate capturing of a fast change in the coordinate data by speeding up the temporal response of the filter, according to the number of objects approaching the detection surface. That is, it is possible to appropriately set a tradeoff between noise removal performance of the filter processing and a response speed of the coordinate data according to the number of objects approaching the detection surface.

Preferably, the filter processing unit may slow a temporal response of the filter when the number of objects determined to approach the detection surface by the approach determination unit is greater than 1 as compared with a case in which the number of the objects is equal to or smaller than 1.

According to the above configuration, in a case in which the number of objects approaching the detection surface is equal to or smaller than 1, a temporal response of the filter becomes relatively fast and a fast change in the coordinate data is easily captured. In a case in which the number of objects approaching the detection surface is greater than 1, the temporal response of the filter becomes relatively slow and a sudden change in the degree-of-approach data due to noise is easily suppressed.

For example, in a case in which the object approaching the detection surface is an operating body such as a finger, when the number of objects is 1, it becomes easy to input accurate information according to the input operation even when a relatively faster input operation is performed by one operating body since the fast change in the coordinate data is easily captured. On the other hand, when the number of objects is plural, it also becomes easy to accurately input information according to the input operation using a plurality of operating bodies in a noisy environment and a plurality of operating bodies can be accurately identified since the sudden change in the coordinate data due to noise is easily suppressed.

Preferably, the filter processing unit may generate a value obtained by multiplying the coordinate data after averaging in a previous cycle and the coordinate data generated by the coordinate/degree-of-approach data generation unit in a current cycle by respective weighting coefficients and summing the resultant coordinate data, as the coordinate data after averaging in the current cycle.

According to the configuration, since the coordinate data after averaging in the current cycle is obtained using the coordinate data after averaging in a previous cycle and the weighting coefficient, data to be stored in order to obtain the coordinate data after averaging is less and a calculation process is simplified.

An input device according to a third aspect of the present invention is an input device that inputs information according to a state of approach of an object to a detection surface, the input device including: a sensor unit configured to detect a degree of approach of the object at a plurality of positions of the detection surface; a sensor control unit configured to control the sensor unit so that the sensor unit performs a periodic detection operation of detecting a degree of approach of the object at the plurality of positions in each cycle; a coordinate/degree-of-approach data generation unit configured to generate coordinate data indicating coordinates of a position of the same object approaching the detection surface and degree-of-approach data indicating the degree of approach at the coordinates over a plurality of cycles of the detection operation on the basis of a result of the detection of the sensor unit in each cycle of the detection operation; a noise detection unit configured to detect noise included in a result of the detection of the sensor unit; an approach determination unit configured to compare the degree-of-approach data of each object with a threshold value in each cycle of the detection operation, and determine, for each object, whether the object approaches the detection surface on the basis of a result of the comparison; and a threshold value adjustment unit configured to adjust the threshold value according to the level of noise detected in the noise detection unit.

According to the above configuration, it is determined whether the object approaches the detection surface on the basis of a result of comparing the threshold value adjusted according to the level of the noise detected in the noise detection unit with the degree-of-approach data. Accordingly, even in a case in which a noise component overlaps the degree-of-approach data, it is possible to appropriately reduce an error in the determination due to the influence of noise since it is determined whether the object approaches using an appropriate threshold value adjusted according to the level of the noise.

Preferably, the threshold value adjustment unit may adjust the threshold value so that it is difficult for the object to be determined to approach the detection surface in the approach determination unit as the level of the noise detected in the noise detection unit increases.

According to the above configuration, in a case in which the level of the noise increases, it is possible to reduce a frequency at which the object is erroneously determined to approach the detection surface despite the absence of the object since the threshold value is adjusted so that it is difficult for the object to be determined to approach the detection surface. Further, in a case in which the level of noise is low, it is possible to relatively improve the object detection sensitivity since it is relatively easy for the object to be determined to approach the detection surface.

Preferably, the threshold value adjustment unit may adjust the threshold value according to the number of objects determined to approach the detection surface in the approach determination unit.

According to the above configuration, the threshold value is adjusted according to the number of objects determined to approach the detection surface. Therefore, it can be selected whether to reduce an error of the approach determination of the object due to noise by adjusting the threshold value so that it is difficult for the object to be determined to approach the detection surface or to increase the object detection sensitivity by adjusting the threshold value so that it is easy for the object to be determined to approach the detection surface, according to the number of objects approaching the detection surface. That is, a tradeoff between prevention of an erroneous determination due to noise and object detection sensitivity can be appropriately set according to the number of objects approaching the detection surface.

Preferably, when the number of objects determined to approach the detection surface in the approach determination unit is greater than 1, the threshold value adjustment unit adjusts the threshold value so that it is difficult for the object to be determined to approach the detection surface in the approach determination unit, as compared with a case in which the number of the objects is equal to or smaller than 1.

According to the above configuration, in a case in which the number of objects approaching the detection surface is equal to or smaller than 1, it is relatively easy for the object to be determined to approach the detection surface. In a case in which the number of objects approaching the detection surface is greater than 1, it is relatively difficult for the object to be determined to approach the detection surface.

For example, in a case in which the object approaching the detection surface is an operating body such as a finger, when the number of operating bodies approaching the detection surface is 1, it is relatively easy for the operating body to be determined to approach the detection surface. Accordingly, even when an input operation is performed in a state in which the degree of approach is relatively low, it is possible to sensitively input information according to the input operation. On the other hand, since it is relatively difficult for the operating body to be determined to approach the detection surface when the number of operating bodies approaching the detection surface is plural, it is difficult for the operating body to be erroneously determined to approach the detection surface in a noisy environment, and it is easy to accurately input information according to an input operation using a plurality of operating bodies.

A method of controlling an input device according to a fourth aspect of the present invention is a method of controlling an input device in which a computer controls the input device that includes a sensor unit configured to detect an approach state of an object at a plurality of positions of a detection surface, and inputs information according to a state of approach of the object to the detection surface, the method comprising the steps of: controlling the sensor unit so that the sensor unit performs a periodic detection operation of detecting a degree of approach of the object at the plurality of positions in each cycle; generating coordinate data indicating coordinates of a position of the same object approaching the detection surface and degree-of-approach data indicating the degree of approach at the coordinates over a plurality of cycles of the detection operation on the basis of a result of the detection of the sensor unit in each cycle of the detection operation; detecting noise included in a result of the detection of the sensor unit; and performing processing of a predetermined filter that averages a series of degree-of-approach data of the same object that is generated over a plurality of cycles of the detection operation, in each cycle of the detection operation, and acquiring a result of filter processing as degree-of-approach data after averaging. The step of performing processing of the filter includes changing response characteristics of the filter processing according to a level of the noise detected in the step of performing detection of the noise.

Preferably, the method of controlling an input device according to the fourth aspect may further include the step of: comparing the degree-of-approach data after averaging of each object with a threshold value in each cycle of the detection operation, and determining, for each object, whether the object approaches the detection surface on the basis of a result of the comparison. The step of performing processing of the filter may include changing response characteristics of the filter according to the number of objects determined to approach the detection surface in the step of determining whether the object approaches.

A method of controlling an input device according to a fifth aspect of the present invention is a method of controlling an input device in which a computer controls the input device that includes a sensor unit configured to detect an approach state of an object at a plurality of positions of a detection surface, and inputs information according to a state of approach of the object to the detection surface, the method including the steps of: controlling the sensor unit so that the sensor unit performs a periodic detection operation of detecting a degree of approach of the object at the plurality of positions in each cycle; generating coordinate data indicating coordinates of a position of the same object approaching the detection surface and degree-of-approach data indicating the degree of approach at the coordinates over a plurality of cycles of the detection operation on the basis of a result of the detection of the sensor unit in each cycle of the detection operation; detecting noise included in a result of the detection of the sensor unit; and performing predetermined filter processing of averaging a series of coordinate data of the same object that is generated over a plurality of cycles of the detection operation, in each cycle of the detection operation, and generating a result of the filter processing as coordinate data after averaging. The step of performing processing of the filter includes changing response characteristics of the filter processing according to a level of the noise detected in the step of performing detection of the noise.

Preferably, the method of controlling an input device according to the fifth aspect may further include the step of: comparing the degree-of-approach data of each object with a threshold value in each cycle of the detection operation, and determining, for each object, whether the object approaches the detection surface on the basis of a result of the comparison. The step of performing processing of the filter may include changing response characteristics of the filter according to the number of objects determined to approach the detection surface in the step of determining whether the object approaches.

A method of controlling an input device according to a sixth aspect of the present invention is a method of controlling an input device in which a computer controls the input device that includes a sensor unit configured to detect an approach state of an object at a plurality of positions of a detection surface, and inputs information according to a state of approach of the object to the detection surface, the method comprising the steps of: controlling the sensor unit so that the sensor unit performs a periodic detection operation of detecting a degree of approach of the object at the plurality of positions in each cycle; generating coordinate data indicating coordinates of a position of the same object approaching the detection surface and degree-of-approach data indicating the degree of approach at the coordinates over a plurality of cycles of the detection operation on the basis of a result of the detection of the sensor unit in each cycle of the detection operation; detecting noise included in a result of the detection of the sensor unit; comparing the degree-of-approach data of each object with a threshold value in each cycle of the detection operation, and determining, for each object, whether the object approaches the detection surface on the basis of a result of the comparison; and adjusting the threshold value according to the level of noise detected in the noise detection unit.

Preferably, the step of adjusting the threshold value may include adjusting the threshold value according to the number of objects determined to approach the detection surface in the step of determining whether the object approaches.

A seventh aspect of the present invention relates to a program for causing a computer to execute the method of controlling an input device according to the fourth to sixth aspects of the present invention.

According to the present invention, it is possible to prevent information according to the state of the approach of the object to the detection surface from being input incorrectly due to noise.

DESCRIPTION OF THE PREFERRED EMBODIMENTS

First Embodiment

Figure 1:
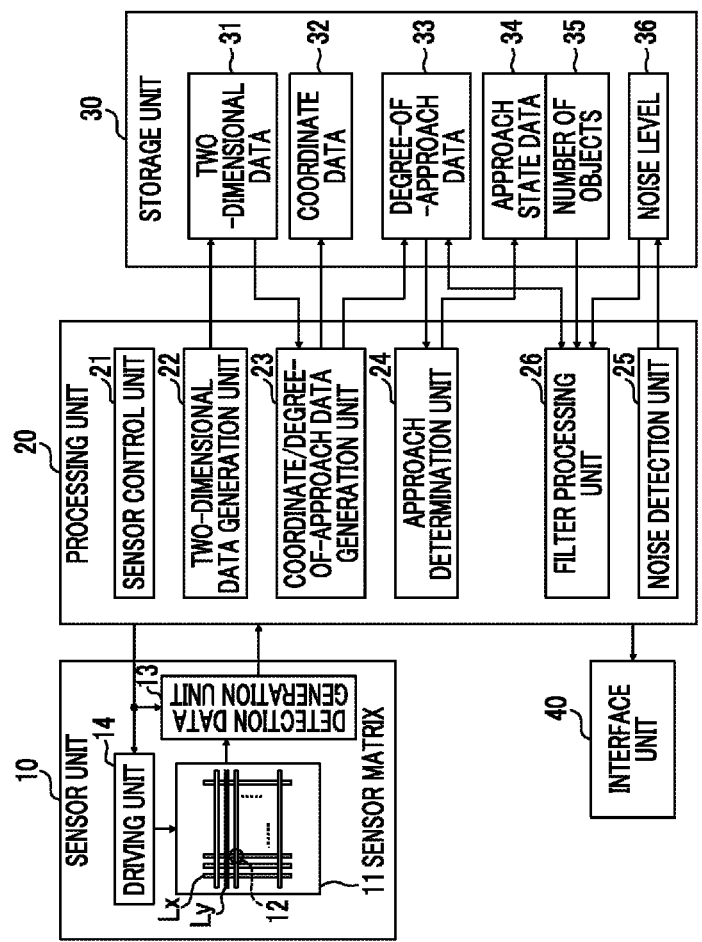
FIG. 1 is a diagram illustrating an example of a configuration of an input device according to a first embodiment.

FIG. 1 is a diagram illustrating an example of a configuration of an input device according to a first embodiment. The input device illustrated in FIG. 1 includes a sensor unit 10, a processing unit 20, a storage unit 30, and an interface unit 40. The input device according to this embodiment is a device that inputs information according to an approach state by causing an object such as a finger or a pen to approach a detection surface on which a sensor is provided. The "approach" in this specification includes both of being close in a contact state and being close in a non-contact state.

Sensor Unit 10

The sensor unit 10 detects a degree of approach of an object such as a finger or a pen at each of a plurality of detection positions distributed in a detection surface, and generates a result of the detection as detection data. For example, the sensor unit 10 includes a sensor matrix 11 in which capacitive sensor elements (capacitors) 12 of which the capacitance changes according to the approach of an object are formed in a matrix form, a detection data generation unit 13 that generates detection data corresponding to the capacitance of a capacitive sensor element 12, and a driving unit 14 that applies a driving voltage to the capacitive sensor element 12.

The sensor matrix 11 includes a plurality of driving electrodes Lx extending in a vertical direction, and a plurality of detection electrodes Ly extending in a horizontal direction. The plurality of driving electrodes Lx are arranged in parallel in the horizontal direction, and the plurality of detection electrodes Ly are arranged in parallel in the vertical direction. The plurality of driving electrodes Lx and the plurality of detection electrodes Ly intersect in a grating form, and are insulated from each other. The capacitive sensor element 12 is formed near an intersection portion of the driving electrode Lx and the detection electrode Ly. Further, in the example of FIG. 1, shapes of the electrodes (Lx and Ly) are drawn in a strip shape, but may be any other shape (for example, a diamond pattern).

The driving unit 14 applies a driving voltage to each capacitive sensor element 12 of the sensor matrix 11. For example, the driving unit 14 sequentially selects one driving electrode Lx from among the plurality of driving electrodes Lx under the control of the processing unit 20, and periodically changes a potential of the selected driving electrode Lx. A potential of the driving electrode Lx changes in a predetermined range, and thus, the driving voltage applied to the capacitive sensor element 12 formed near the intersection point of this driving electrode Lx and the detection electrode Ly changes in a predetermined range, and the capacitive sensor element 12 is charged or discharged.

The detection data generation unit 13 generates the detection data according to charge transferred in each detection electrode Ly when the capacitive sensor element 12 is charged or discharged due to the driving unit 14 applying the driving voltage. That is, the detection data generation unit 13 samples the charge transferred in each detection electrode Ly at a timing synchronized with a periodic change in the driving voltage of the driving unit 14, and generates the detection data indicating a degree of approach of the object according to a result of the sampling.

For example, the detection data generation unit 13 includes a capacitance-to-voltage conversion circuit (CV conversion circuit) that outputs a voltage according to the capacitance of the capacitive sensor element 12, and an analog-to-digital conversion circuit (AD conversion circuit) that converts an output signal of the CV conversion circuit into a digital signal and outputs the digital signal as detection data.

The CV conversion circuit samples the charge transferred in the detection electrode Ly under control of the processing unit 20 each time the driving voltage of the driving unit 14 periodically changes and the capacitive sensor element 12 is charged or discharged. Specifically, each time a positive or negative charge is transferred in the detection electrode Ly, the CV conversion circuit transfers this charge or a charge proportional thereto to a capacitor for reference, and outputs a signal according to a voltage generated in the capacitor for reference. For example, the CV conversion circuit outputs a signal according to an integrated value or an average value of the charge periodically transferred in the detection electrode Ly or a charge proportional thereto. The AD conversion circuit converts the output signal of the CV conversion circuit into a digital signal in a predetermined period under control of the processing unit 20, and outputs a result of the conversion as detection data indicating the degree of approach of the object.

Further, while the sensor unit 10 shown in the above-described example detects approach of the object based on a change in the capacitance (mutual capacitance) generated between the electrodes (Lx and Ly), the present invention is not limited thereto and the approach of the object may be detected using various other schemes. For example, the sensor unit 10 may adopt a scheme of detecting capacitance (self-capacitance) generated between the electrode and a ground due to the approach of the object. In the case of a scheme of detecting the self-capacitance, a driving voltage is applied to the detection electrode. Further, the sensor unit 10 is not limited to a capacitance scheme, and may be of, for example, a resistance film scheme or an electromagnetic induction type.

Processing Unit 20

The processing unit 20 is a circuit that controls an entire operation of the input device and includes, for example, a computer that performs processing according to instruction codes of a program stored in the storage unit 30 to be described or a logic circuit that realizes a specific function. All of the processing of the processing unit 20 may be realized by the computer and the program, or a part or all thereof may be realized by a dedicated logic circuit.

In the example of FIG. 1, the processing unit 20 includes a sensor control unit 21, two-dimensional data generation unit 22, a coordinate/degree-of-approach data generation unit 23, an approach determination unit 24, a noise detection unit 25, and a filter processing unit 26.

The sensor control unit 21 controls the sensor unit 10 so that the sensor unit 10 performs a periodic detection operation of detecting the degree of approach of the object in a plurality of detection positions (capacitive sensor elements 12 of the sensor matrix 11) of a detection surface in every one of cycles. Specifically, the sensor control unit 21 controls circuits of the driving unit 14 and the detection data generation unit 13 so that selection of the driving electrode and generation of a pulse voltage in the driving unit 14, and selection of the detection electrode and generation of detection data in the detection data generation unit 13 are periodically performed at an appropriate timing.

Based on the detection result of the sensor unit 10, the two-dimensional data generation unit 22 generates two-dimensional data 31 in a matrix form that includes a plurality of data based on the degree of approach of the object at a plurality of positions on the detection surface, and stores the two-dimensional data 31 in the storage unit 30.

For example, the two-dimensional data generation unit 22 stores the detection data output from the sensor unit 10 in matrix form in a storage area (current value memory) of the storage unit 30. The two-dimensional data generation unit 22 calculates a difference between the detection data in a matrix form stored in the current value memory and a base value in a matrix form previously stored in another storage area (base value memory) of the storage unit 30, and stores a result of the calculation as two-dimensional data 31 in the storage unit 30. In the base value memory, a value (base value) serving as a reference of the detection data in a state in which the object does not approach the detection surface is stored. The two-dimensional data 31 indicates a change amount of the detection data from the state in which the object does not approach the detection surface.

The coordinate/degree-of-approach data generation unit 23 generates data regarding the approach of the object to the detection surface based on the detection result of the sensor unit 10 at each cycle of a detection operation of the sensor unit 10. One of the generated data is coordinate data 32 indicating coordinate P of a position of the same object approaching the detection surface over a plurality of cycles of the detection operation. X and Y coordinates on an XY plane set in the detection surface are an example of the coordinate data 32.

Further, another data generated by the coordinate/degree-of-approach data generation unit 23 is degree-of-approach data 33 indicating the degree of approach at the coordinate P(X, Y) of the position of the same object. A Z value at the coordinate P is an example of the degree-of-approach data 33. A Z axis is perpendicular to the above-described XY plane. The Z value along the Z axis becomes a greater value as an object approaches the detection surface and a smaller value as the object is away from the detection surface.

The coordinate/degree-of-approach data generation unit 23 assigns the same identification code i to the coordinate data 32 and the degree-of-approach data 33 of the same object over a plurality of cycles of the detection operation of the sensor unit 10. The identification code i is information for tracking the same object over a plurality of cycles. For example, the coordinate/degree-of-approach data generation unit 23 calculates each distance between the coordinate P indicated by the coordinate data 32 generated in a previous cycle and the coordinate P indicated by the coordinate data 32 newly generated in a current cycle, and specifies a combination of the previous coordinate P and the current coordinate P between which the distance is shortest, as a pair of coordinates P of the same object. The coordinate/degree-of-approach data generation unit 23 assign the identification code i as that of the coordinate data 32 and the degree-of-approach data 33 according to the previous coordinate P of the same object, to the coordinate data 32 and the degree-of-approach data 33 according to the current coordinate P.

Further, the coordinate/degree-of-approach data generation unit 23 assigns the identification code i to approach state data 34 indicating whether the object approaches the detection surface, in addition to the coordinate data 32 and the degree-of-approach data 33. For example, the coordinate/degree-of-approach data generation unit 23 assigns the same identification code i to the coordinate data 32, the degree-of-approach data 33, and the approach state data 34 in the same cycle of the same object over a plurality of cycles of the detection operation. That is, the coordinate/degree-of-approach data generation unit 23 treats the coordinate data 32, the degree-of-approach data 33, and the approach state data 34 of the same object generated in the same cycle as one data, and assigns the identification code i to the data.

The approach determination unit 24 compares the degree-of-approach data 33 of each object with a threshold value in each cycle of a detection operation. For the degree-of-approach data 33 that is a comparison target, degree-of-approach data 33 after averaging is used when an averaging process to be described below is performed. The threshold value includes a first approach threshold value THt1 and a second approach threshold value THt2. Initial values of the first approach threshold value THt1 and the second approach threshold value Tht2 are stored in the storage unit 30, and the initial values are used as they are unless otherwise described.

The second approach threshold value Tht2 has a greater value than the first approach threshold value THt1. The approach determination unit 24 determines that the object does not approach the detection surface (away from the detection surface) when the degree-of-approach data 33 is smaller than the first approach threshold value THt1, and determines that the object approaches the detection surface when the degree-of-approach data 33 is greater than the second approach threshold value THt2. Accordingly, since the determination result does not change when the degree-of-approach data 33 has a value between the first approach threshold value THt1 and the second approach threshold value THt2, a result of the determination can be prevented from being frequently changed due to a change in the degree-of-approach data 33 in a value close to the threshold values.

The approach determination unit 24 determines, for each object, whether the object approaches the detection surface on the basis of a result of the comparison, and stores a result of the determination as the above-described approach state data 34 in the storage unit 30. For example, since the degree-of-approach data 33 (Z-value) exceeds the threshold value when the object comes into contact with the detection surface, the approach determination unit 24 stores approach state data 34 indicating that the object approaches the detection surface in the storage unit 30. Since there may be a plurality of objects in contact with the detection surface, the approach determination unit 24 performs the contact determination on each of the object.

Further, when the object does not come in contact with the detection surface, but approaches the detection surface to a certain extent, the object may be regarded as coming in contact. When the object comes into contact with the detection surface in this manner and when the degree-of-approach data 33 (Z value) of the object exceeds the threshold value due to sufficient approach of the object to the detection surface, the approach determination unit 24 determines that the object approaches the detection surface. Further, the approach determination unit 24 counts the number 35 of objects approaching the detection surface of the sensor unit 10 (particularly, the number of operating bodies such as fingers) based on the approach state data 34 acquired for each object.

The noise detection unit 25 detects noise included in the detection result of the sensor unit 10 and obtains the noise level 36. Various causes are considered in the noise, but the noise is noise that causes a fluctuation of a detection value of which the same value is to be originally obtained in the sensor unit 10. So, the noise detection unit 25 acquires, from the sensor unit 10, the result of detection of the degree of approach of the object continuously performed a plurality of times at the same detection position of the detection surface. For example, the noise detection unit 25 acquires, from the sensor unit 10, detection data obtained continuously a plurality of times (for example, three times or more) at the same detection position. The noise detection unit 25 specifies a maximum value and a minimum value among the plurality of detection data obtained through the plurality of detections, and obtains a value obtained by subtracting the minimum value from the maximum value as the noise level 36.

The filter processing unit 26 performs processing of a predetermined filter for averaging a series of degree-of-approach data 33 of the same object generated over a plurality of cycles of the detection operation and acquires a result thereof as degree-of-approach data 33 after averaging in each cycle of the detection operation of the sensor unit 10. Since the coordinate/degree-of-approach data generation unit 23 generates the degree-of-approach data 33 of each object in each cycle of the detection operation, the degree-of-approach data 33 over a plurality of successive cycles is obtained for each object. The filter processing unit 26 performs filter processing for averaging on the degree-of-approach data 33 of a series of cycles obtained for each object, and obtains the averaged degree-of-approach data 33.

For example, the filter processing unit 26 generates a value obtained by multiplying the degree-of-approach data 33 after averaging in a previous cycle and the degree-of-approach data 33 before averaging generated by the coordinate/degree-of-approach data generation unit 23 in a current cycle by respective weighting coefficients and summing the resultant degree-of-approach data, as the degree-of-approach data 33 after averaging in the current cycle.

If the degree-of-approach data 33 after averaging acquired in the previous cycle for the object to which the identification code i is assigned is "$Zout\_old_i$," the degree-of-approach data 33 before averaging acquired in the current cycle is "$Zin_i$", and the degree-of-approach data 33 after averaging in the current cycle is "$Zout_i$", the filter processing unit 26 calculates "$Zout_i$" using the following equation.

$$Zout_i = \{Zin_i + (W-1)*Zout\_old_i\}/W \quad (1)$$

"W" in Equation (1) is a parameter for setting a weighting coefficient by which "$Zin_i$" and "$Zout\_old_i$" are multiplied.

In a case in which "W" is equal to "1", since a weight coefficient "(W−1)/W" of "$Zout\_old_i$" becomes zero and a weighting coefficient "1/W" of "$Zin_i$" is "1", "$Zin_i$" is equal to "$Zout_i$" as it is. In this case, the filter processing unit 26 does not perform filter processing for averaging. In a case in which "W" is greater than "1", the weighting coefficient "(W−1)/W" of "$Zout\_old_i$" increases and the weighting coefficient "1/W" of "$Zin_i$" deceases as the value of "W" increases. Accordingly, the temporal response of the filter becomes slow and noise removal performance is improved.

Further, the filter processing unit 26 changes the response characteristics of the filter according to the noise level 36 detected in the noise detection unit 25. Specifically, the filter processing unit 26 slows the temporal response of the filter if the noise level 36 detected in the noise detection unit 25 increases. On the other hand, in a case in which the noise level 36 detected in the noise detection unit 25 is lower than a reference value, the filter processing unit 26 outputs the degree-of-approach data 33 obtained in the coordinate/degree-of-approach data generation unit 23 as it is without performing the filter processing for averaging. For example, the filter processing unit 26 changes the parameter W of the weighting coefficient in Equation (1) according to the noise level 36 detected in the noise detection unit 25.

Further, the filter processing unit 26 changes the response characteristics of the filter according to the number 35 of objects determined to approach the detection surface in the approach determination unit 24. In particular, the filter processing unit 26 slows the temporal response of the filter in a case in which the number 35 of objects determined to approach the detection surface in the approach determination unit 24 is greater than "1", as compared to a case in which the number 35 of objects is equal to or smaller than "1". For example, the filter processing unit 26 changes the parameter W of the weighting coefficient in Equation (1) according to the number 35 of objects determined to approach the detection surface.

The number 35 of objects includes, for example, the number of operating bodies, such as fingers determined to approach the detection surface. In a case in which the number of fingers that perform an operation is 1, an operation of a relatively fast motion such as a flick operation is often performed, whereas in a case in which the number of fingers is 2 or greater, an operation of a relatively fast motion such as a pinch operation is often performed. Thus, since a response time required for filter processing is different if the number of fingers to operate is different, the filter processing unit 26 selects filter processing with an appropriate response time according to the number 35 of objects.

Storage Unit 30

The storage unit 30 stores constant data or variable data that is used for processing in the processing unit 20. When the processing unit 20 includes a computer, the storage unit 30 may store a program to be executed in the computer. The storage unit 30 includes, for example, a volatile memory such as a DRAM or an SRAM, a nonvolatile memory such as a flash memory, a hard disk, or the like.

Interface Unit 40

The interface unit 40 is a circuit for exchanging data between the input device and another control device (for example, a control IC of an information device having an input device mounted thereon). The processing unit 20 outputs information (for example, the number 35 of objects, the coordinate data 32 of each object, the degree-of-approach data 33, or the approach state data 34) stored in the storage unit 30 from the interface unit 40 to a control device (not illustrated). Further, the interface unit 40 may acquire a program to be executed in a computer of the processing unit 20 from a disk drive device (not illustrated) (a device that reads a program recorded in a non-transitory storage medium), a server, or the like, and load the program onto the storage unit 30.

Figure 2:
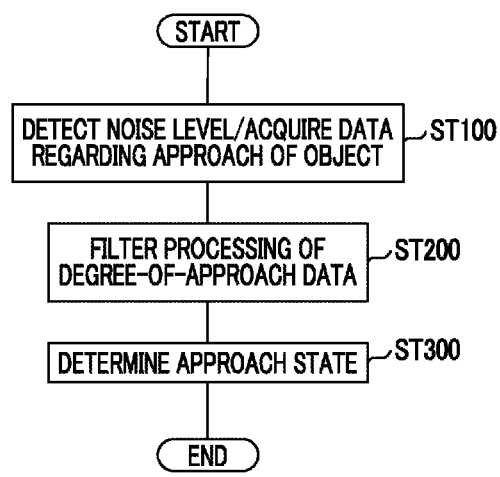
FIG. 2 is a flowchart illustrating an entire process of the input device according to the first embodiment.

Next, an operation of the input device having the above-described configuration will be described. FIG. 2 is a flowchart illustrating an entire process of the input device according to the first embodiment. A series of processes illustrated in FIG. 2 is executed in each detection operation of one cycle in which the sensor unit 10 detects the degree of approach of an object at a plurality of detection positions of the detection surface.

ST100:

First, the noise detection unit 25 obtains the noise level 36 and the coordinate/degree-of-approach data generation unit 23 obtains the coordinate data 32 and the degree-of-approach data 33. The approach determination unit 24 determines an approach state of each object based on the degree-of-approach data 33, and obtains the number 35 of objects approaching the detection surface. Details will be described with reference to the flowchart of FIG. 3.

ST200:

The filter processing unit 26 performs filter processing on the degree-of-approach data 33 obtained for each object. Details will be described with reference to a flowchart of FIG. 4.

ST300:

The approach determination unit 24 determines a state of the approach of each object to the detection surface. Details will be described with reference to a flowchart of FIG. 5.

Next, the process (a noise detection process and a data acquisition process) of step ST100 in the flowchart illustrated in FIG. 2 will be described with reference to the flowchart of FIG. 3.

ST105:

First, the sensor control unit 21 controls the sensor unit 10 so that a degree of detection of the object at the same detection position of the detection surface is detected continuously a plurality of times (for example, three times or more). The noise detection unit 25 acquires a plurality of detection data obtained through the plurality of detections from the sensor unit 10.

ST110:

The noise detection unit 25 calculates a noise level 36 based on the plurality of detection data acquired in step ST105. For example, the noise detection unit 25 specifies a maximum value and a minimum value among the plurality of detection data obtained through plurality of detections, and obtains a value obtained by subtracting the minimum value from the maximum value as the noise level 36.

ST115:

The sensor control unit 21 controls the sensor unit 10 so that the sensor unit 10 detects a degree of approach of the object on the entire surface of the detection surface (the sensor matrix 11). The two-dimensional data generation unit 22 acquires the detection data of the entire detection surface which is generated as the detection result of the sensor unit 10.

ST120:

The two-dimensional data generation unit 22 calculates a difference between the detection data of each detection position of the detection surface acquired from the sensor unit 10 and a base value of each detection position set in advance. For example, the two-dimensional data generation unit 22 temporarily stores the detection data of each detection position of the detection surface acquired from the sensor unit 10 in matrix form in a predetermined storage area (current value memory) of the storage unit 30. The two-dimensional data generation unit 22 calculates a difference between a base value in a matrix form stored in another storage area (base value memory) of the storage unit 30 in advance and the detection data in a matrix form stored in the current value memory, and stores a result of the calculation as two-dimensional data 31 in the storage unit 30. In the base value memory, a value (base value) that is a reference of the detection data in a state in which the object does not approach the detection surface is stored. Each data constituting the two-dimensional data 31 corresponds to a change amount of each detection data from the state in which the object does not approach the detection surface, and indicates the degree of approach of the object at each detection position relative to a non-approach state of the object.

ST125:

The coordinate/degree-of-approach data generation unit 23 generates the coordinate data 32 and the degree-of-approach data 33 of each object approaching the detection surface based on the two-dimensional data 31 calculated in step ST120. For example, based on a distribution of the degree of approach of the object on the detection surface indicated by the two-dimensional data 31, the coordinate/degree-of-approach data generation unit 23 generates a position at which the degree of approach of the object is higher than a predetermined reference as the coordinate data 32 of the object approach position, and generates the degree of approach of the object at the object approach position as the degree-of-approach data 33.

Further, the coordinate/degree-of-approach data generation unit 23 assigns the identification code i for tracking the same object over a plurality of cycles to the coordinate data 32 and the degree-of-approach data 33. For example, the coordinate/degree-of-approach data generation unit 23 calculates a distance between the coordinates of the approach position of each object in a previous cycle and the coordinates of the approach position of the object in a current cycle, and specifies a pair of coordinates between which the distance is short as a pair of coordinates of the same object. The coordinate/degree-of-approach data generation unit 23 determines the identification code i to be assigned to the coordinate data 32 and the degree-of-approach data 33 of each object generated in the current cycle based on a pair of coordinates of the same object that has been specified.

ST130:

The approach determination unit 24 compares the degree-of-approach data 33 of each object acquired in step 125 with the first approach threshold value Tht1.

ST135:

The approach determination unit 24 counts the number of objects of which the degree-of-approach data 33 is greater than the first approach threshold value THt1, and acquires a result of counting as the number 35 of objects.

Figure 4:
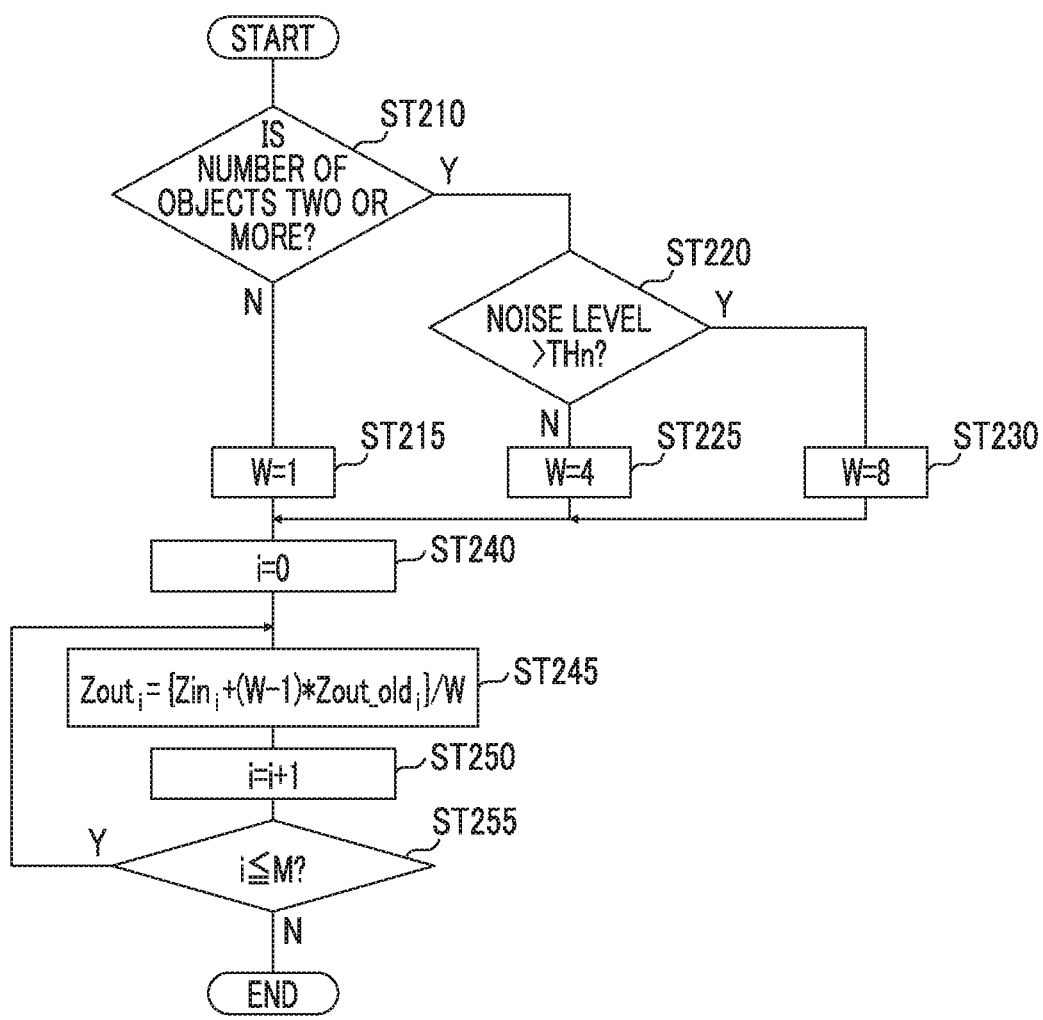
FIG. 4 is a flowchart illustrating filter processing of degree-of-approach data in the flowchart illustrated in FIG. 2.

Next, a process of step ST200 (filter processing of the degree-of-approach data 33) in the flowchart of FIG. 2 will be described with reference to the flowchart of FIG. 4.

Figure 3:
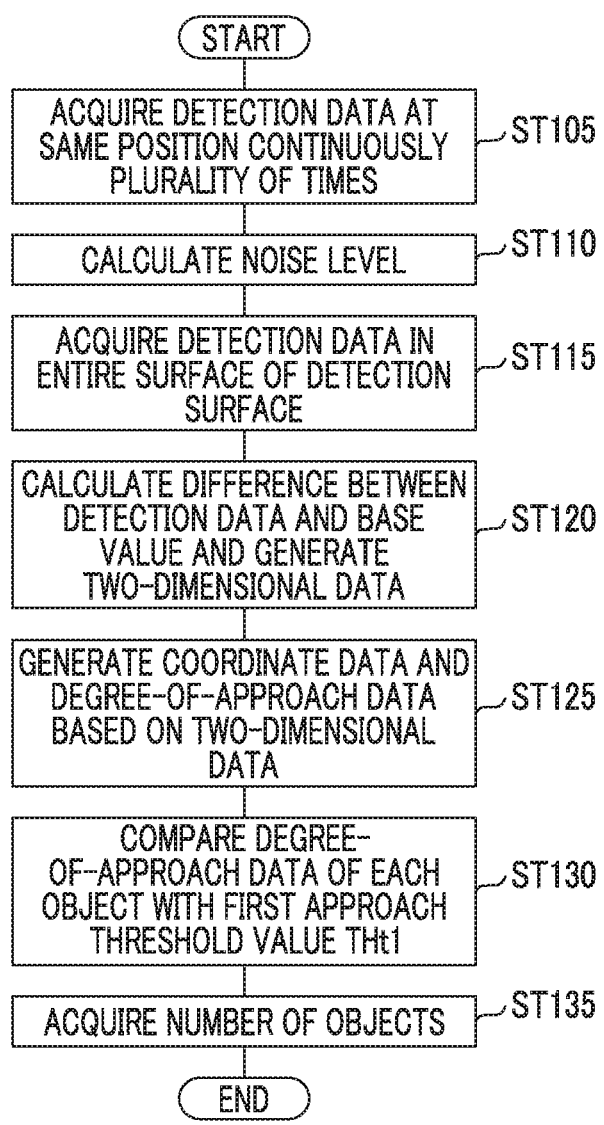
FIG. 3 is a flowchart illustrating a process of detecting a noise level and a process of acquiring data regarding the approach of an object in the flowchart illustrated in FIG. 2.

ST210:

The filter processing unit 26 determines whether the number 35 of objects is two or more by referring to the number 35 of objects acquired in step ST135 (FIG. 3).

ST215:

In a case in which the number 35 of objects is not two or more ("1" or "0"), the filter processing unit 26 sets the parameter W of the weighting coefficient "1".

ST220:

In a case in which the number 35 of objects is two or more, the filter processing unit 26 determines whether the noise level 36 is greater than a predetermined noise threshold value THn by referring to the noise level 36 acquired in step ST105 (FIG. 3).

ST225:

In a case in which the noise level 36 is determined not to be greater than the noise threshold value THn, the filter processing unit 26 sets the parameter W of the weighting coefficient to "4".

ST230:

In a case in which the noise level 36 is determined to be greater than the noise threshold value THn, the filter processing unit 26 sets the parameter W of the weighting coefficient to "8".

ST240:

After setting the parameter W of the weighting coefficient in steps ST215, ST225, and ST230 as described above, the filter processing unit 26 sets the identification code i of the object "0" to an initial value in in order to perform a filter processing for the degree-of-approach data 33 of each object.

ST245:

The filter processing unit 26 performs filter processing on the degree-of-approach data 33 of the object specified by the identification code i. That is, the filter processing unit 26 calculates "$Zout_i$" that is the degree-of-approach data 33 after averaging in the current cycle using Equation (1) based on the "$Zout\_old_i$" that is the degree-of-approach data 33 after averaging acquired in the previous cycle for the object to which the identification code i is assigned, "$Zin_i$" that is the degree-of-approach data 33 before averaging acquired in the current cycle, and the parameter W of the weighting coefficient set in the above-described step.

ST250:

If the filter processing unit 26 executes filter processing in step ST245, the filter processing unit 26 increments the value of the identification code i by one.

ST255:

The filter processing unit 26 determines whether the value of the identification code i is equal to or smaller than a constant value M. The constant value M indicates a maximum number that enables an object approaching the detection surface to be identified. In a case in which the filter processing unit 26 returns to step ST245 in a case in which the value of the identification code i is equal to or smaller than the constant value M, and ends a series of processes in step ST200 in a case in which the value of the identification code i becomes greater than the constant value M.

Next, the process (the process of determining an approach state) of step ST300 in the flowchart of FIG. 2 will be described with reference to a flowchart of FIG. 5.

ST305:

The approach determination unit 24 determines whether it is immediately after power is turned on.

ST310:

In a case in which it is immediately after the power is turned on, the approach determination unit 24 sets the approach state data 34 to "no approach" for all objects specified by the respective identification codes i. The approach state data 34 is data indicating whether or not the object approaches the detection surface and is, for example, binary data in which values "0" and "1" are assigned to "approach" and "no approach".

ST315:

The approach determination unit 24 sets the identification code i of the object to an initial value "0" in order to perform loop processing of determining an approach state of each object.

ST320:

The approach determination unit 24 determines whether or not the approach state data 34 of the object specified by the identification code i indicates "approach".

ST325:

In a case in which the approach state data 34 indicates "no approach" in step ST320, the approach determination unit 24 compares degree-of-approach data "$Zout_i$" after averaging calculated in step ST245 (FIG. 4) with the second approach threshold value THt2. In a case in which "$Zout_i$" is greater than the second approach threshold value THt2, the approach determination unit 24 proceeds to step ST330, and otherwise, proceeds to step ST345.

ST330:

In a case in which the degree-of-approach data "$Zout_i$" after averaging is greater than the second approach threshold value Tht2, the approach determination unit 24 sets the approach state data 34 of the object specified by the identification code i to "approach" and proceeds to step ST345.

ST335:

On the other hand, in a case in which the approach state data 34 indicates "approach" in step ST320, the approach determination unit 24 compares the degree-of-approach data "$Zout_i$" after averaging calculated in step ST245 (FIG. 4) with the first approach threshold value THt1. In a case in which "$Zout_i$" is smaller than the first approach threshold value THt1, the approach determination unit 24 proceeds to step ST340, and otherwise, proceed to step ST345.

ST340:

If the degree-of-approach data after averaging "$Zout_i$" is equal to or smaller than the first approach threshold value THt1, approach determination unit 24, set the approach state data 34 of the specified by the identification code i object to "No approach", proceeds to step ST345.

ST345:

After passing through the respective steps described above, the filter processing unit 26 increments the value of the identification code i by one.

ST350:

The filter processing unit 26 determines whether the value of the identification code i is equal to or smaller than a constant value M. In a case in which the value of the identification code i is equal to or smaller than M, the filter processing unit 26 returns to step ST320, and in a case in which the value of the identification code i is greater than M, the filter processing unit 26 ends a series of processes in step ST300.

As described above, according to the input device of the present embodiment, a series of degree-of-approach data 33 of the same object generated over a plurality of cycles of the detection operation is averaged in the filter processing of the filter processing unit 26, and accordingly, the degree-of-approach data 33 after averaging ("$Zout_i$" of Equation (1)) is acquired. Therefore, even in a case in which the degree-of-approach data 33 is temporarily greatly changed due to the influence of noise, such a temporary change in the degree-of-approach data 33 after averaging is suppressed. Therefore, it is possible to obtain the stable degree-of-approach data 33 of which the temporary change in the value due to the influence of noise is suppressed.

Further, according to the input device of the present embodiment, response characteristics of the filter in the filter processing of the filter processing unit 26 are changed according to the noise level 35 which is detected by the noise detection unit 25. Accordingly, since appropriate filter processing according to the noise level 35 is performed on the degree-of-approach data 33, it is possible to obtain the degree-of-approach data 33 in which the influence of noise is reduced more effectively. That is, in a case in which the level of noise increases, the temporal response of the filter is slow. Accordingly, since a temporarily sudden change in the degree-of-approach data 33 is effectively suppressed, it is possible to effectively reduce a change in the degree-of-approach data 33 due to the influence of noise. Further, in a case in which the level of noise is low, the temporal response of the filter is relatively fast. Accordingly, since the temporarily sudden change in the degree-of-approach data 33 is easily captured, it is possible to obtain accurate degree-of-approach data 33 according to a motion of the object approaching the detection surface even in a case in which the motion of the object approaching the detection surface is fast.

Further, according to the input device of this embodiment, the response characteristics of the filter in the filter processing unit 26 are changed according to the number of objects determined to approach the detection surface. Therefore, it can be selected whether to facilitate suppression of the sudden change in the degree-of-approach data 33 due to noise by slowing the temporal response of the filter or facilitate capturing of a fast change in the degree-of-approach data 33 by speeding up the temporal response of the filter, according to the number of objects approaching the detection surface. That is, it is possible to appropriately set a tradeoff between noise removal performance of the filter processing and a response speed of the degree-of-approach data 33 according to the number of objects approaching the detection surface.

For example, in the input device according to this embodiment, in a case in which the number of objects approaching the detection surface is equal to or smaller than "1", a temporal response of the filter becomes relatively fast and a fast change in the degree-of-approach data 33 is easily captured. In a case in which the number of objects approaching the detection surface is greater than "1", the temporal response of the filter becomes relatively slow and a sudden change in the degree-of-approach data 33 due to noise is easily suppressed. Accordingly, in a case in which an input operation is performed by a finger approaching the detection surface, when the input operation is performed by one finger, it becomes easy to accurately input information according to the input operation even when a relatively faster input operation is performed by one finger since the fast change in the degree-of-approach data 33 is easily acquired. On the other hand, when an input operation is performed by a plurality of fingers, it also becomes easy to accurately input information according to the input operation using a plurality of fingers in a noisy environment since the sudden change in the degree-of-approach data 33 due to noise is easily suppressed.

Further, according to the input device of the present embodiment, the degree-of-approach data 33 ("Zout$_i$" in Equation (1)) after averaging in the current cycle is obtained using the degree-of-approach data 33 ("Zout_old$_i$" in Equation (1)) after averaging in the previous cycle and the weighting coefficient ("1/W" and "(W−1)/W") in Equation (1)). That is, it is possible to calculate "Zout$_i$" using "Zout_old$_i$" and "W" stored in the storage unit 30. Therefore, it is possible to reduce the data to be stored in order to obtain the degree-of-approach data 33 after averaging and to simplify a calculation process.

Further, according to the input device of the present embodiment, since it is determined whether the object approaches the detection surface using the degree-of-approach data 33 after averaging in the filter processing unit 26, it is difficult for an object that does not actually exist to be determined to exist due to the influence of the noise.

Second Embodiment

Next, a second embodiment of the present invention will be described. The filter processing is performed on the degree-of-approach data 33 in the input device according to the first embodiment described above, whereas the filter processing is performed on the coordinate data 32 in an input device according to the present embodiment.

Figure 6:
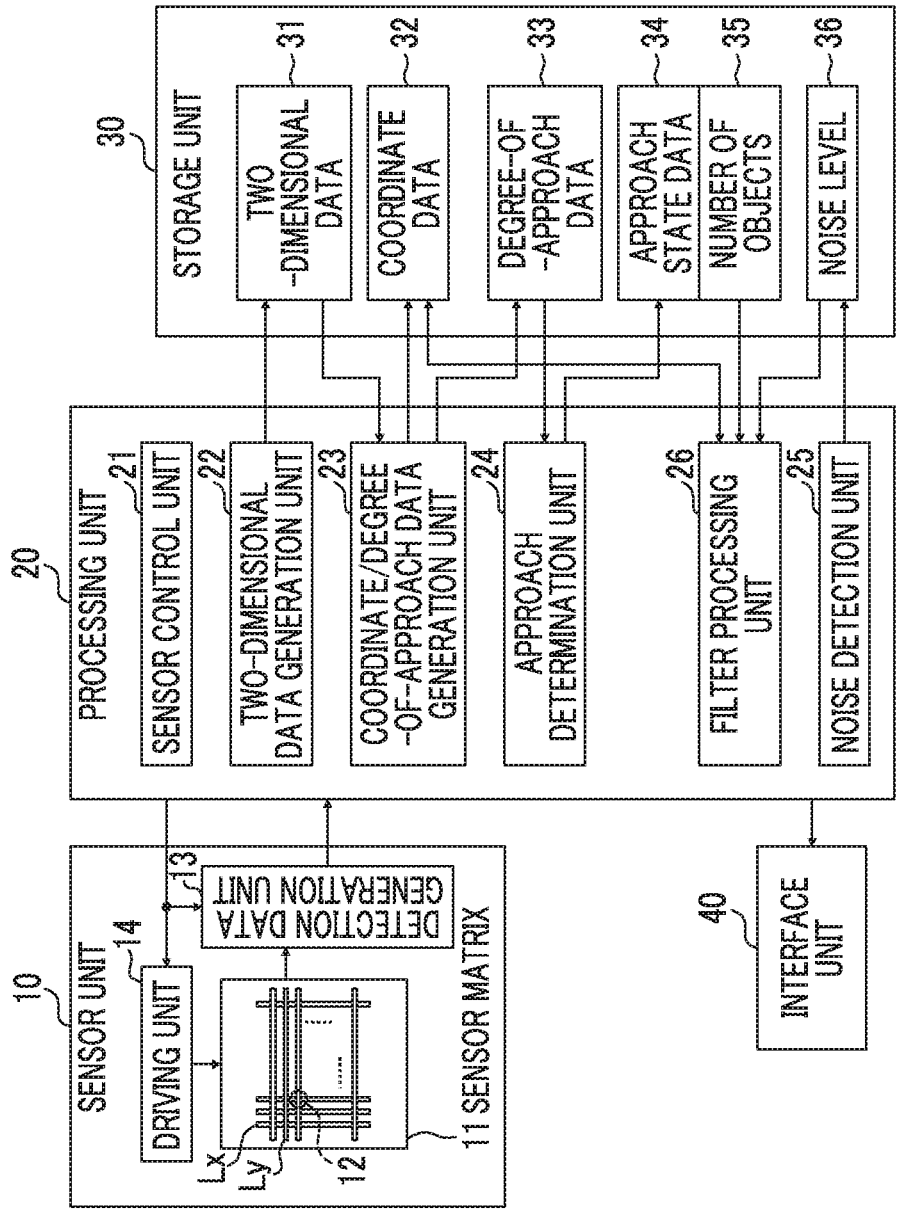
FIG. 6 is a diagram illustrating an example of a configuration of an input device according to a second embodiment.

FIG. 6 is a diagram illustrating an example of a configuration of the input device according to the second embodiment. The input device illustrated in FIG. 6 includes a sensor unit 10, a processing unit 20, a storage unit 30, and an interface unit 40. Since a basic structure of the input device according to the second embodiment illustrated in FIG. 6 is the same as the input device of the first embodiment illustrated in FIG. 1 and the filter processing unit 26 is partially different, a different configuration will be mainly described hereinafter.

The filter processing unit 26 performs processing of a predetermined filter for averaging a series of coordinate data 32 of the same object generated over a plurality of cycles of the detection operation and acquires a result thereof as coordinate data 32 after averaging in each cycle of the detection operation of the sensor unit 10. Since the coordinate/degree-of-approach data generation unit 23 generates the coordinate data 32 of each object in each cycle of the detection operation, the coordinate data 32 over a plurality of successive cycles is obtained for each object. The filter processing unit 26 performs filter processing for averaging on the coordinate data 32 of a series of cycles obtained for each object, and obtains the averaged coordinate data 32.

For example, the filter processing unit 26 generates a value obtained by multiplying the coordinate data 32 after averaging in a previous cycle and the coordinate data 32 before averaging generated by the coordinate/degree-of-approach data generation unit 23 in a current cycle by respective weighting coefficients and summing the resultant coordinate date, as the coordinate data 32 after averaging in the current cycle.

If the coordinate data 32 of the X-axis after averaging acquired in the previous cycle for the object to which the identification code i is assigned is "Xout_old$_i$," the coordinate data 32 of the X-axis before averaging acquired in the current cycle is "Xin$_i$," and the coordinate data 32 of the X-axis after averaging in the current cycle is "Xout$_i$," the filter processing unit 26 calculates "Xout$_i$" using the following equation.

$$Xout_i = (Xin_i + (Wxy-1)*Xout\_old_i)/Wxy \quad (2)$$

Further, if the coordinate data 32 of the Y-axis after averaging acquired in the previous cycle for the object to which the identification code i is assigned is "Yout_oldi", the coordinate data 32 of the Y-axis before averaging acquired in the current cycle is "Yini", and the coordinate data 32 of the Y-axis after averaging in the current cycle is "Youti", the filter processing unit 26 calculates "Youti" using the following equation.

$$Yout_i = (Yin_i + (Wxy-1)*Yout\_old_i)/Wxy \quad (3)$$

"Wxy" in Equations (2) and (3) is a parameter for setting the weighting coefficient, similar to "W" in Equation (1). For example, in a case in which "Wxy" is equal to "1" in Equation (2), the weighting coefficient "(Wxy−1)/Wxy" of "Xout_old$_i$" becomes zero and the weighting coefficient "1/Wxy" of "Xin$_i$" becomes "1". Accordingly, "Xin$_i$" becomes equal to "Xout$_i$" as it is. In this case, the filter processing unit 26 does not perform the filter processing for averaging. In a case in which "Wxy" is greater than "1", the weighting coefficient "(Wxy−1)/Wxy" of "Xout_old$_i$" increases and the weighting coefficient "1/Wxy" of "Xin$_i$" decreases as a value of "Wxy" increases. Accordingly, a temporal response of the filter is slow and noise removal performance is improved. This tendency of the temporal response of the filter according to "Wxy" is the same in Equation (3).

Further, the filter processing unit 26 changes the response characteristics of the filter according to the noise level 36 detected in the noise detection unit 25. Specifically, the filter processing unit 26 slows the temporal response of the filter if the noise level 36 detected in the noise detection unit 25 increases. On the other hand, in a case in which the noise level 36 detected in the noise detection unit 25 is lower than a reference value, the filter processing unit 26 outputs the coordinate data 32 obtained in the coordinate/degree-of-approach data generation unit 23 as it is without performing the filter processing for averaging. For example, the filter processing unit 26 changes the parameter Wxy of the weighting coefficient in Equations (2) and (3) according to the noise level 36 detected in the noise detection unit 25.

Further, the filter processing unit 26 changes the response characteristics of the filter according to the number 35 of objects determined to approach the detection surface in the approach determination unit 24. In particular, the filter processing unit 26 slows the temporal response of the filter in a case in which the number 35 of objects determined to approach the detection surface in the approach determination unit 24 is greater than "1", as compared to a case in which the number 35 of objects is equal to or smaller than "1". For example, the filter processing unit 26 changes the parameter Wxy of the weighting coefficient in Equations (2) and (3) according to the number 35 of objects determined to approach the detection surface.

Figure 7:
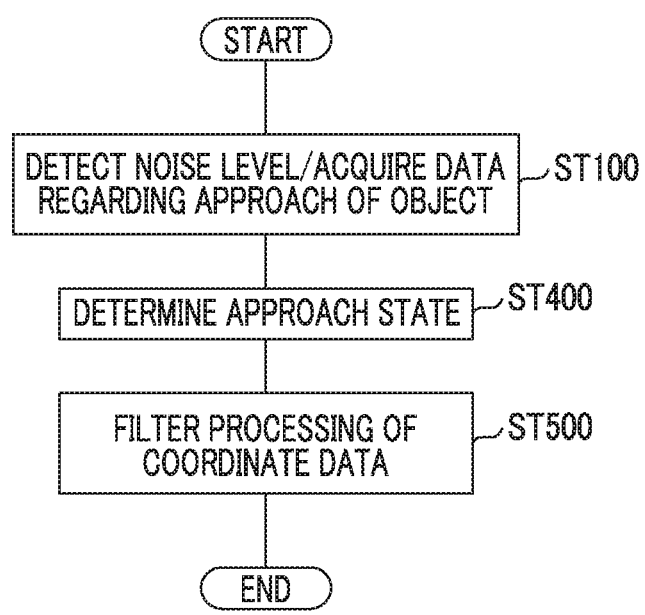
FIG. 7 is a flowchart illustrating an entire process of the input device according to the second embodiment.

Next, an operation of the input device having the above-described configuration will be described. FIG. 7 is a flowchart illustrating an entire process of the input device according to the second embodiment. A series of processes illustrated in FIG. 7 is executed in each detection operation of one cycle in which the sensor unit 10 detects the degree of approach of an object at a plurality of detection positions of the detection surface.

ST100:
First, the noise detection unit 25 obtains the noise level 36 and the coordinate/degree-of-approach data generation unit 23 obtains the coordinate data 32 and the degree-of-approach data 33. The approach determination unit 24 determines an approach state of each object based on the degree-of-approach data 33, and obtains the number 35 of objects approaching the detection surface. Since this process is the same as step ST100 described with reference to the flowchart in FIG. 3, further description will be omitted.

ST400:
The approach determination unit 24 determines an approach state of each object to the detection surface. Details will be described with reference to a flowchart of FIG. 8.

ST500:
The filter processing unit 26 performs filter processing on the coordinate data 32 obtained for each object. Details will be described with reference to a flowchart of FIG. 9.

Next, the process (the process of determining an approach state) of step ST400 in the flowchart of FIG. 7 will be described with reference to a flowchart of FIG. 8.

Figure 5:
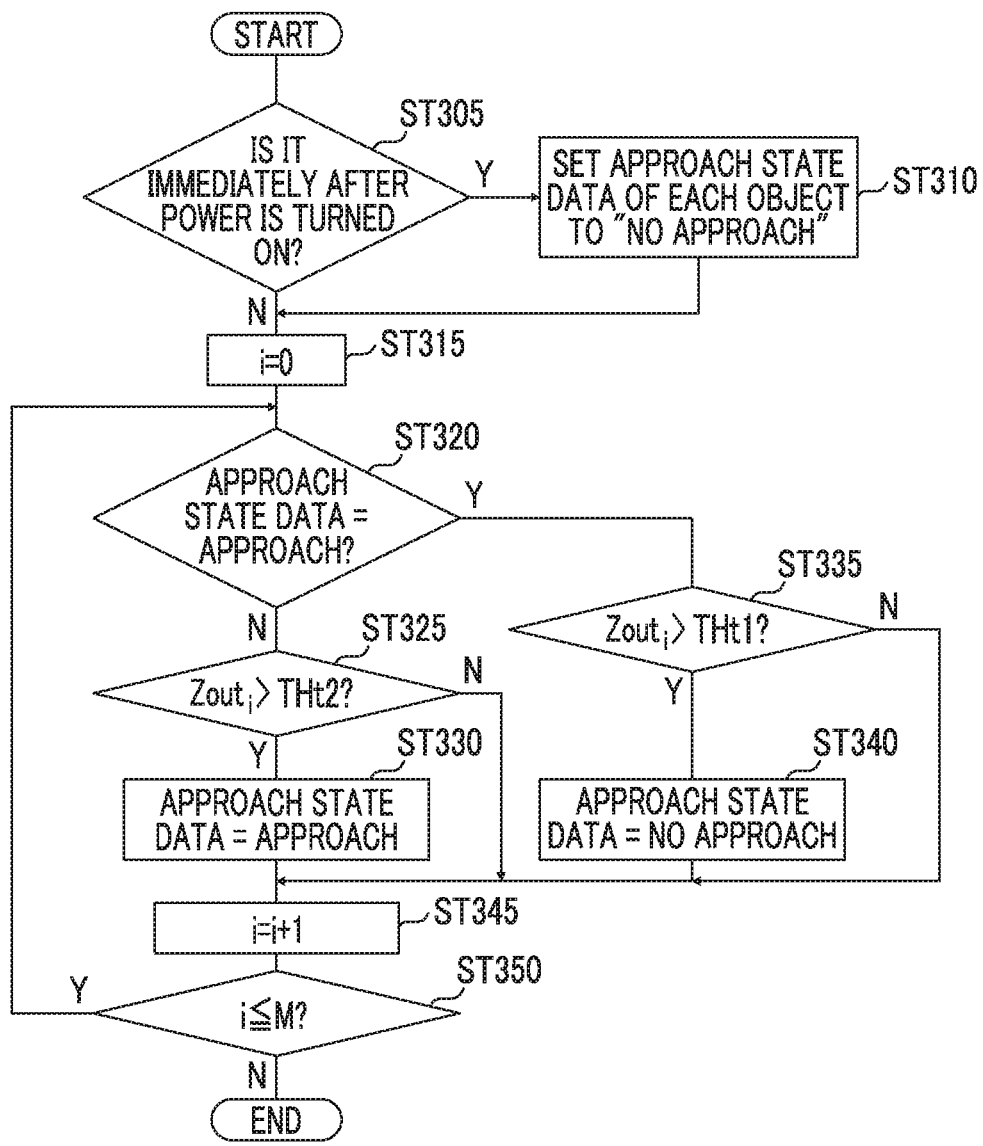
FIG. 5 is a flowchart illustrating a process of determining an approach state in the flowchart illustrated in FIG. 2.
Figure 8:
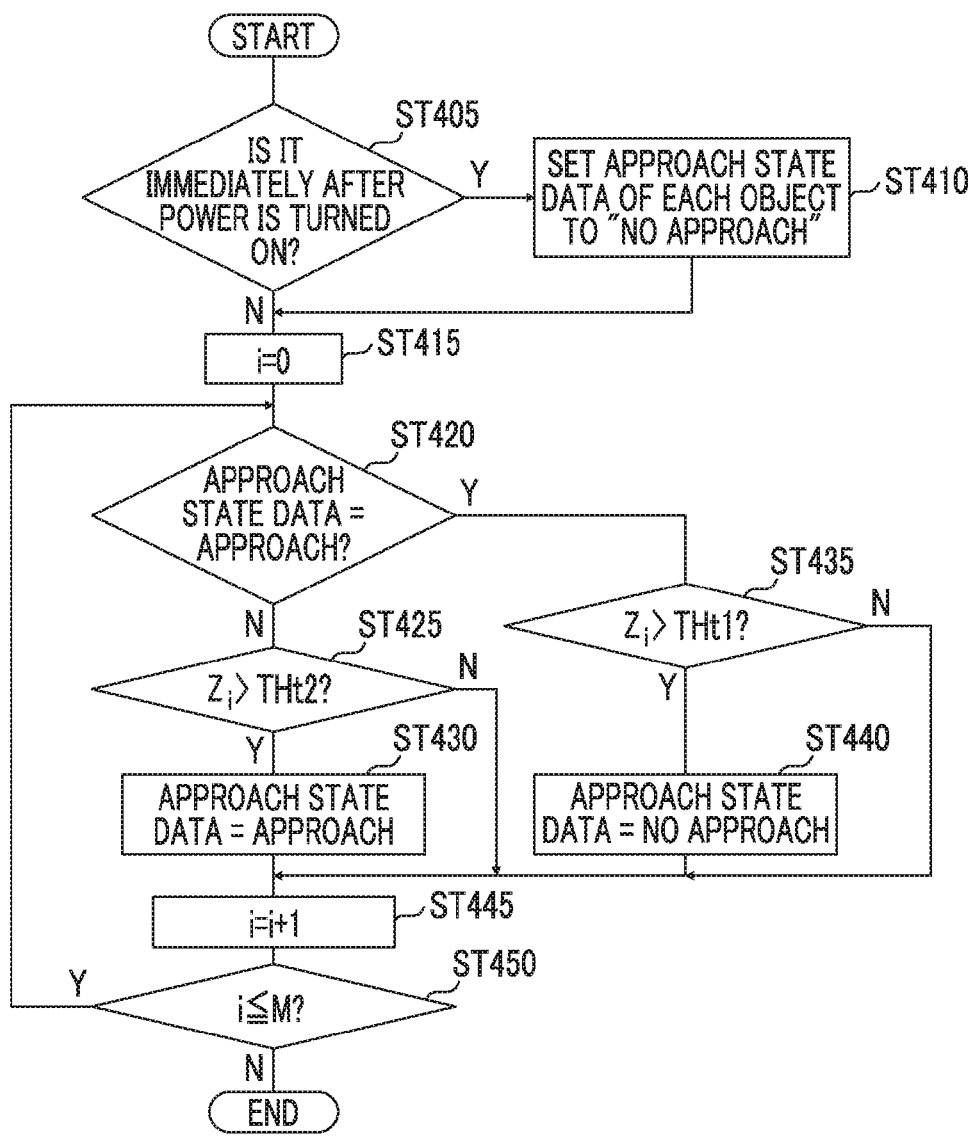
FIG. 8 is a flowchart illustrating a process of determining an approach state in the flowchart illustrated in FIG. 7.

Steps ST405 to ST450 in the flowchart illustrated in FIG. 8 correspond to steps ST305 to ST350 in the flowchart illustrated in FIG. 5. Among these steps, content of the processes is different between step ST425 in FIG. 8 and step ST325 in FIG. 5 and between step ST435 in FIG. 8 and step ST325 in FIG. 5, but the same processes are performed in other steps. Therefore, only steps ST425 and ST435 in which content of the processes is different from the steps the flowchart of FIG. 5 will be described.

ST425:
In a case in which the approach state data 34 indicates "no approach" in step ST420, the approach determination unit 24 compares "Zi" that is the degree-of-approach data 33 of the identification code i acquired in step ST100 (FIG. 7) with the second approach threshold value THt2. In a case in which "Zi" is greater than the second approach threshold value THt2, the approach determination unit 24 proceeds to step ST430, and otherwise, proceeds to step ST445.

ST435:
On the other hand, in a case in which the approach state data 34 indicates "approach" in step ST420, the approach determination unit 24 compares "$Z_i$" that is the degree-of-approach data 33 of the identification code i acquired in step ST100 (FIG. 7) with the first approach threshold value THt1. In a case in which "$Z_i$" is smaller than the first approach threshold value THt1, the approach determination unit 24 proceeds to step ST440, and otherwise, proceeds to step ST445.

Next, the process (filter processing of the coordinate data 32) of step ST500 in the flowchart of FIG. 7 will be described with reference to the flowchart of FIGS. 9 and 10.

ST505:
The filter processing unit 26 determines whether the noise level 36 acquired in step ST100 is greater than a first predetermined noise threshold value THn1 by referring to the noise level 36 (FIG. 7).

ST510:
In a case in which the noise level 36 is not greater than the first noise threshold value THn1, the filter processing unit 26 determines whether the number 35 of objects is two or more by referring to the number 35 of objects acquired in step ST100 (FIG. 7).

ST515:
In a case in which the object number is not two or more ("1" or "0"), the filter processing unit 26 sets the parameter Wxy of the weighting coefficient to "1".

ST520:
On the other hand, in a case in which the object number is greater than 1, the filter processing unit 26 sets the parameter Wxy of the weighting coefficient to "2".

ST525:
In a case in which the noise level 36 is determined to be greater than the first noise threshold value THn1 in step ST505, the filter processing unit 26 determines whether the noise level 36 is greater than the second noise threshold value THn2. The second noise threshold value THn2 is greater than the first noise threshold value THn1.

ST530:

In a case in which the noise level 36 is determined not to be greater than the second noise threshold value THn2, the filter processing unit 26 sets the parameter Wxy of the weighting coefficient to "4".

ST535:

On the other hand, in a case in which the noise level 36 is determined to be greater than the second noise threshold value THn2, the filter processing unit 26 sets the parameter Wxy of the weighting coefficient to "8".

Figure 9:
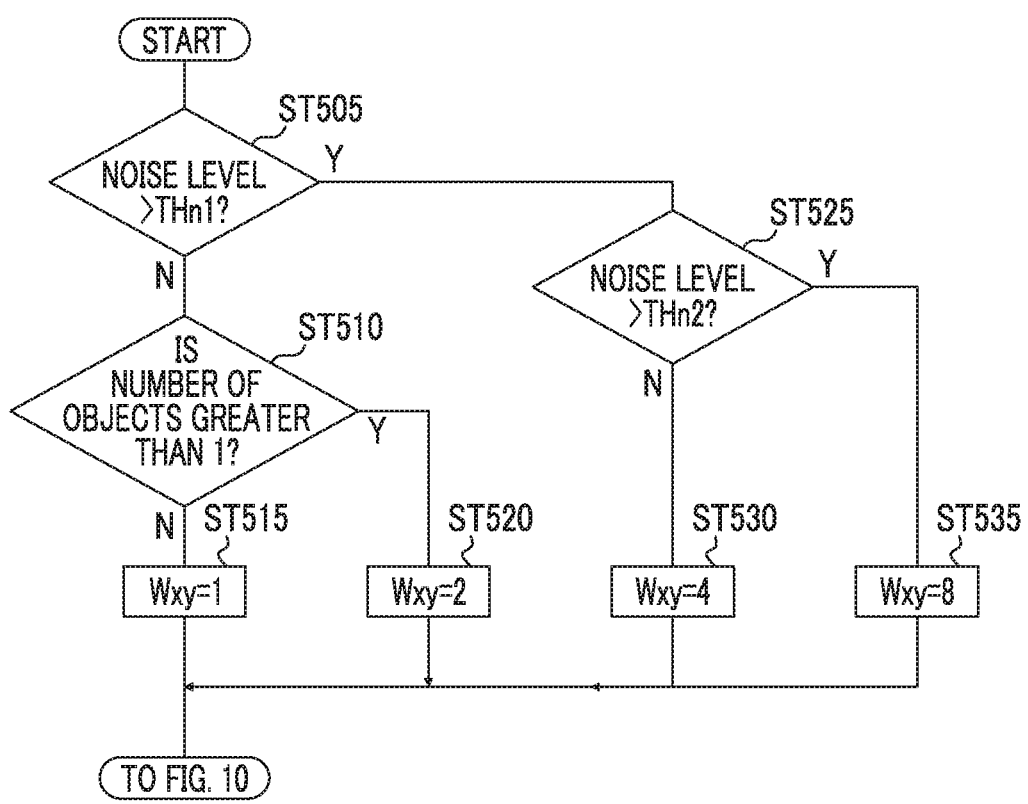
FIG. 9 is a first flowchart illustrating filter processing of coordinate data in the flowchart illustrated in FIG. 7.
Figure 10:
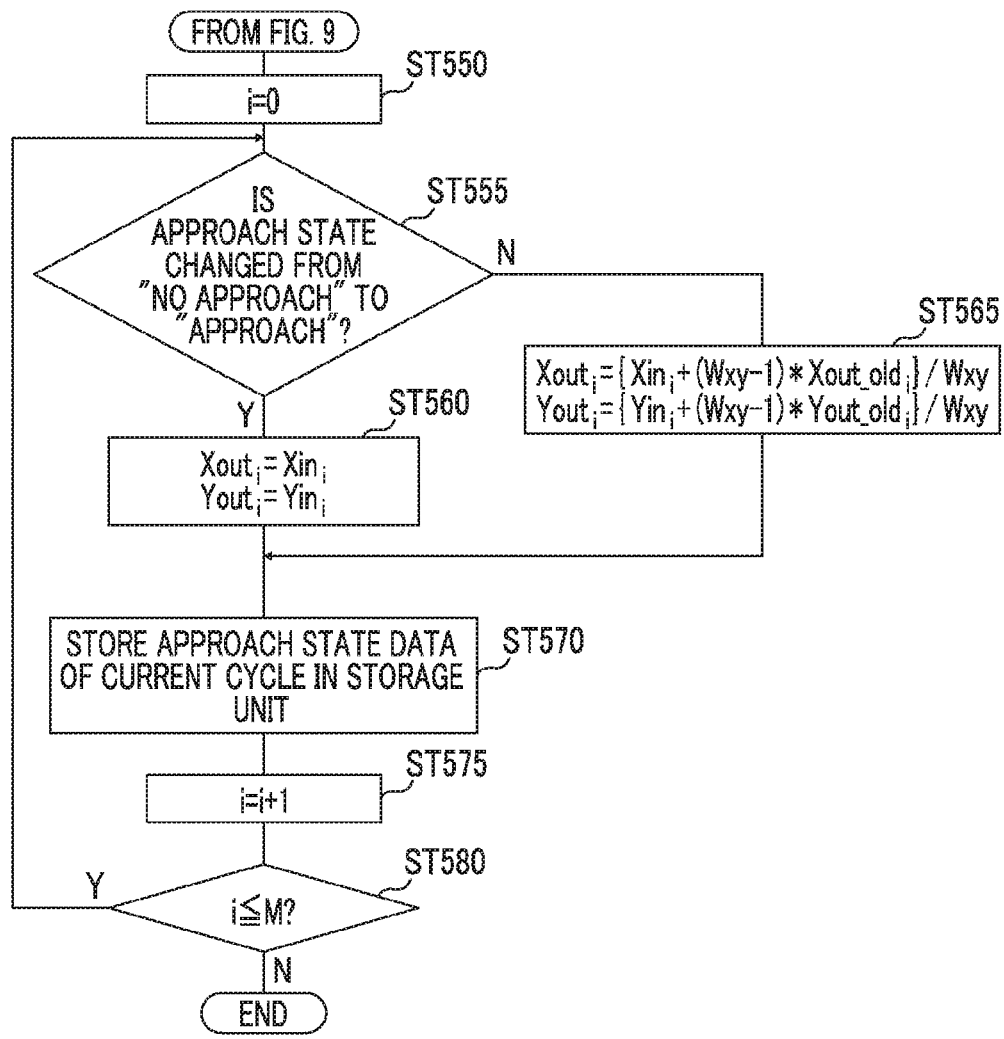
FIG. 10 is a second flowchart illustrating filter processing of coordinate data in the flowchart illustrated in FIG. 7.

After setting the parameter Wxy of the weighting coefficient in the first flowchart illustrated in FIG. 9 as described above, the filter processing unit 26 performs filter processing on the coordinate data 32 of each object, as shown in a second flowchart illustrated in FIG. 10.

ST550:

The filter processing unit 26 sets the identification code i of the object to an initial value "0" in order to perform filter processing of the coordinate data 32 of each object.

ST555:

The filter processing unit 26 determines whether the approach state is changed from "no approach" to "approach" by referring to the approach state data 34 acquired in the previous cycle and the approach state data 34 acquired in the current cycle for the object specified by the identification code i. That is, the filter processing unit 26 determines whether the approach state data 34 of the previous cycle indicates "no approach" and the approach state of the current cycle indicates "approach".

ST560:

In a case in which it is determined in step ST555 that the approach state is changed from "no approach" to "approach", the object as a target does not approach the detection surface in the previous cycle and there is no coordinate data 32. Therefore, filter processing using the coordinate data 32 of the previous cycle cannot be executed. Therefore, in this case, the filter processing unit 26 acquires the coordinate data 32 ($Xin_i$, $Yin_i$) acquired in step 100 as the coordinate data 32 ($Xout_i$, $Yout_i$) after filter processing as it is.

ST565:

On the other hand, in a case in which it is determined in step ST555 that the approach state is not changed from "no approach" to "approach", the filter processing unit 26 calculates the coordinate data 32 ("$Xout_i$", "$Yout_i$") after averaging in the current cycle using Equations (2) and (3) based on the coordinate data 32 ("$Xout\_old_i$", "$Yout\_old_i$") after averaging acquired in the previous cycle for the object to which the identification code i is assigned, the coordinate data 32 ("$Xin_i$", "$Xin_i$") before averaging acquired in the current cycle, and the parameter Wxy of the weight coefficient set in the previous step.

ST570:

The filter processing unit 26 stores the approach state data 34 acquired in the current cycle in the storage unit 30. This approach state data 34 is used for the determination process of step ST555 in the next cycle.

ST575:

If the filter processing unit 26 executes the filter processing of the coordinate data 32 in steps ST555 to ST570, the filter processing unit 26 increments the value of the identification code i by one.

ST580:

The filter processing unit 26 determines whether the value of the identification code i is equal to or smaller than a constant value M. The filter processing unit 26 returns to step ST555 in a case in which the value of the identification code i is equal to or smaller than the constant value M, and ends a series of processes in step ST500 in a case in which the value of the identification code i is greater than the constant value M.

As described above, according to the input device of this embodiment, the coordinate data 32 after averaging ("$Xout_i$" in Equation (2) and "$Yout_i$" in Equation (3)) is obtained by a series of coordinate data 32 of the same object generated over a plurality of cycles of detection operation being averaged in the filter processing of the filter processing unit 26. Therefore, even in a case in which the position indicated by the coordinate data 32 is temporarily greatly changed due to the influence of noise, such a temporary change is suppressed in the coordinate data 32 after averaging. Therefore, the temporary change in the value due to the influence of noise is suppressed and stable coordinate data 32 can be obtained.

Further, according to the input device of the present embodiment, response characteristics of the filter in the filter processing of the filter processing unit 26 are changed according to the noise level 35 which is detected by the noise detection unit 25. Accordingly, since appropriate filter processing according to the noise level 35 is performed on the coordinate data 32, it is possible to obtain the coordinate data 32 in which the influence of noise is reduced more effectively. That is, in a case in which the level of noise increases, the temporal response of the filter is slow. Accordingly, since a temporarily sudden change in the coordinate data 32 is effectively suppressed, it is possible to effectively reduce a change in the coordinate data 32 due to the influence of noise. Further, in a case in which the level of noise is low, the temporal response of the filter is relatively fast. Accordingly, since the temporarily sudden change in the coordinate data 32 is easily captured, it is possible to obtain accurate coordinate data 32 according to a motion of the object approaching the detection surface even in a case in which the motion of the object approaching the detection surface is fast.

Further, according to the input device of this embodiment, the response characteristics of the filter in the filter processing unit 26 are changed according to the number of objects determined to approach the detection surface. Therefore, it can be selected whether to facilitate suppression of the sudden change in the coordinate data 32 due to noise by slowing the temporal response of the filter or facilitate capturing of a fast change in the coordinate data 32 by speeding up the temporal response of the filter, according to the number of objects approaching the detection surface. That is, it is possible to appropriately set a tradeoff between noise removal performance of the filter processing and a response speed of the coordinate data 32 according to the number of objects approaching the detection surface.

For example, in the input device according to this embodiment, in a case in which the number of objects approaching the detection surface is equal to or smaller than "1", a temporal response of the filter becomes relatively fast and a fast change in the coordinate data 32 is easily captured. In a case in which the number of objects approaching the detection surface is greater than "1", the temporal response of the filter becomes relatively slow and a sudden change in the coordinate data 32 due to noise is easily suppressed. Accordingly, in a case in which an input operation is performed by a finger approaching the detection surface, when the input operation is performed by one finger, it becomes easy to accurately input information according to the input operation even when a relatively faster input operation is performed by one finger since the fast change in the coordinate data 32 is easily acquired. On the other hand, when an input operation is performed by a plurality of fingers, it also becomes easy to accurately input information according to the input operation using a plurality of fingers in a noisy environment since the sudden change in the coordinate data 32 due to noise is easily suppressed.

Further, according to the input device of the present embodiment, the coordinate data 32 ("Xout$_i$" in Equation (2) and "Yout$_i$" in Equation (3)) after averaging in the current cycle is obtained using the coordinate data 32 ("Xout_old$_i$" in Equation (2) and "Yout_old$_i$" in Equation (3)) after averaging in the previous cycle, and the weighting coefficient ("1/Wxy" and "(Wxy−1)/Wxy" in Equations (2) and (3)). That is, "Xout$_i$" and "Yout$_i$" can be calculated using "Xout_old$_i$", "Yout_old$_i$", and "Wxy" stored in the storage unit 30. Therefore, it is possible to reduce the data to be stored in order to obtain the coordinate data 32 after averaging, and to simplify a calculation process.

Third Embodiment

Next, a third embodiment of the present invention will be described. In the input devices according to the first and second embodiments described above, a fixed threshold value is used in the determination of the approach state, whereas in an input device according to the third embodiment, the second approach threshold value THt2 that is a comparison target of the degree-of-approach data 33 is adjusted according to a noise detection result.

Figure 11:
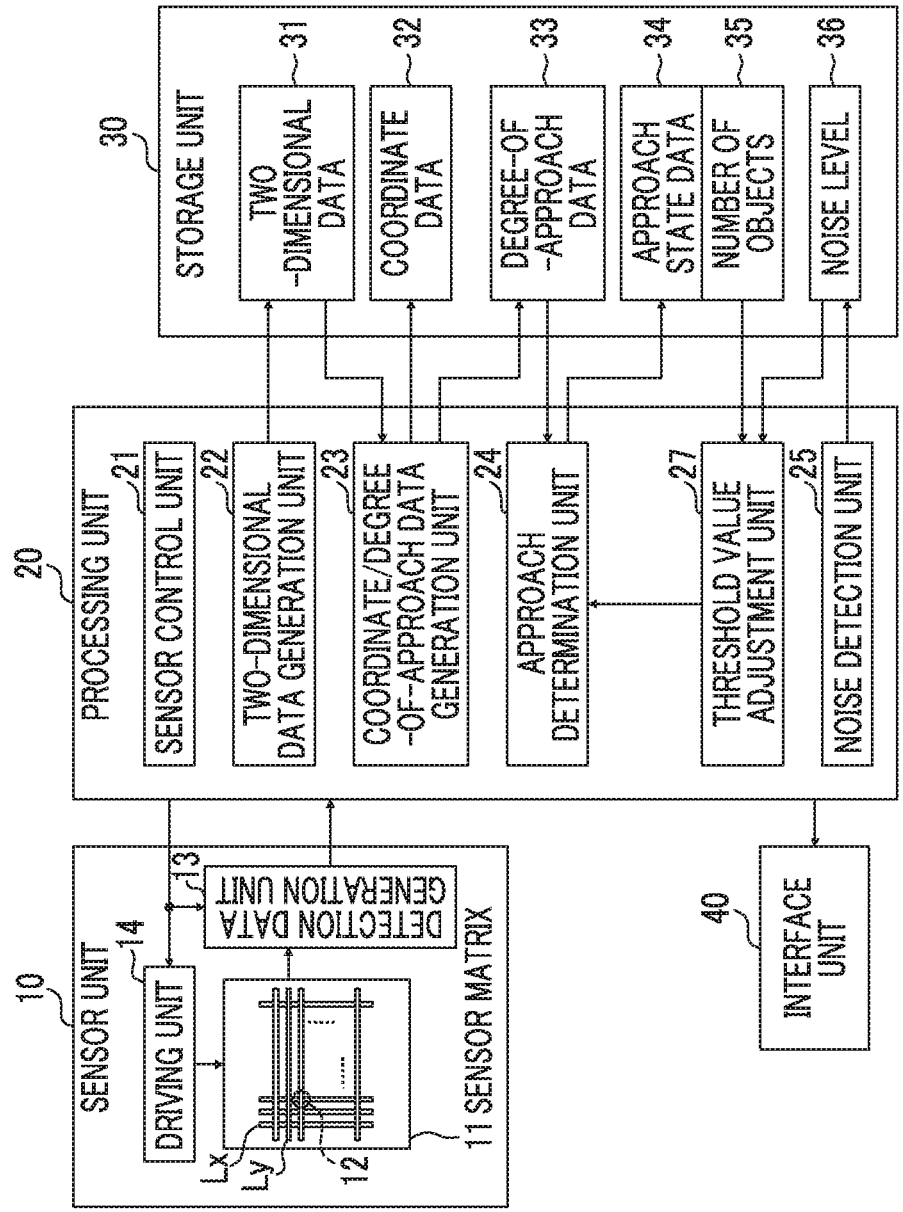
FIG. 11 is a diagram illustrating an example of a configuration of an input device according to a third embodiment.

FIG. 11 is a diagram illustrating an example of a configuration of the input device according to the third embodiment. The input device illustrated in FIG. 11 includes a sensor unit 10, a processing unit 20, a storage unit 30, and an interface unit 40. Since a basic structure of the input device according to the third embodiment illustrated in FIG. 11 is the same as the input device according to the first embodiment illustrated in FIG. 1 and the input device according to the second embodiment illustrated in FIG. 6, and the third embodiment is different from the first and second embodiments in that a threshold value adjustment unit 27 is included as a component of the processing unit 20, a different configuration will be mainly described hereinafter.

The threshold value adjustment unit 27 adjusts the threshold value that is used in the determination of the approach determination unit 24 according to the noise level 36 detected in the noise detection unit 25. This threshold value includes the first approach threshold value THt1 and the second approach threshold value THt2, as described above. Although a description will be given in the present embodiment, particularly, in connection with a case in which the threshold value adjustment unit 27 adjusts the second approach threshold value Tht2, the threshold value adjustment unit 27 may change the first approach threshold value THt1 or may adjust both of the threshold values.

The threshold value adjustment unit 27 adjusts the threshold value so that it is difficult for the object to be determined to approach the detection surface in the approach determination unit 24 as the noise level 36 detected in the noise detection unit 25 increases. The threshold value adjustment unit 27 adjusts the threshold value according to the number 35 of objects determined to approach the detection surface in the approach determination unit 24. In a case in which the number of objects determined to approach the detection surface in the approach determination unit 24 is greater than "1", the threshold value adjustment unit 27 adjusts the threshold value so that it is difficult for the object to be determined to approach the detection surface in the approach determination unit 24, as compared with a case in which the number 35 of objects is equal to or smaller than "1".

Figure 12:
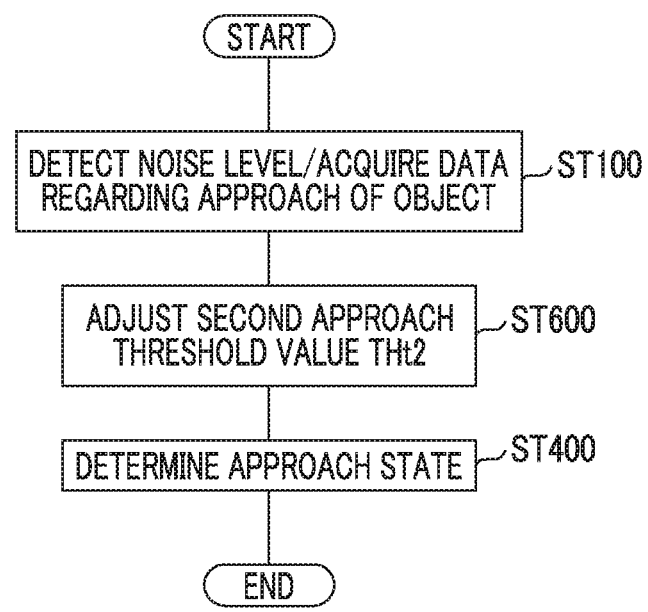
FIG. 12 is a flowchart illustrating an entire process of the input device according to the third embodiment.

Next, an operation of the input device having the above-described configuration will be described. FIG. 12 is a flowchart illustrating an entire process of the input device according to the third embodiment.

ST100:

First, the noise detection unit 25 obtains the noise level 36 and the coordinate/degree-of-approach data generation unit 23 obtains the coordinate data 32 and the degree-of-approach data 33. The approach determination unit 24 determines an approach state of each object based on the degree-of-approach data 33, and obtains the number 35 of objects approaching the detection surface. Since this process is the same as step ST100 described with reference to the flowchart in FIG. 3, further description will be omitted.

ST600:

The threshold value adjustment unit 27 adjusts the second approach threshold value THt2 according to the noise level 35 acquired in step ST100. Details will be described with reference to a flowchart of FIG. 13.

ST400:

If the threshold value is adjusted, the approach determination unit 24 determines a state of approach of each object to the detection surface. Since this process is the same as step ST400 described with reference to the flowchart in FIG. 8, further description is omitted.

Figure 13:
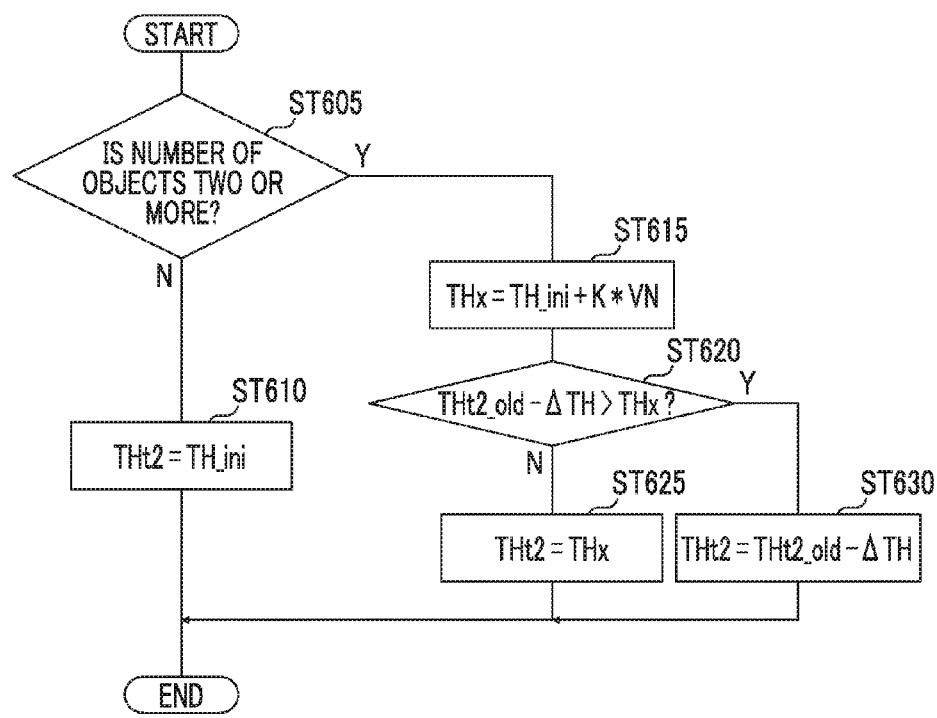
FIG. 13 is a flowchart illustrating a process of adjusting a threshold value in a flowchart illustrated in FIG. 12.

Next, a process (a process of adjusting the threshold value) of step ST600 in a flowchart illustrated in FIG. 12 will be described with reference to the flowchart of FIG. 13.

ST605:

The threshold value adjustment unit 27 determines whether the number 35 of objects is two or more by referring to the number 35 of objects acquired in step ST100 (FIG. 12).

ST610:

In a case in which the number 35 of objects is not two or more ("1" or "0"), the threshold value adjustment unit 27 sets the second approach threshold value THt2 to a predetermined initial value THini, and ends the process of step ST600.

ST615:

In a case in which the number 35 of objects is two or more, the threshold value adjustment unit 27 calculates an adjustment threshold value THx that is a value according to the noise level 35 using the following equation.

$$THx = THini + K \cdot VN \qquad (4)$$

In Equation (4), "VN" indicates the noise level 35 in a current cycle acquired in step ST100 (FIG. 12), and "K" indicates a predetermined proportional coefficient.

ST620:

The threshold value adjustment unit 27 determines whether "THt2_old−ΔTH" is greater than the adjustment threshold value THx calculated in step ST620. "THt2_old" indicates the second approach threshold value THt2 determined in the previous cycle. Further, "ΔTH" is a constant value, and determines a maximum value of a decrease width of the second approach threshold value THt2 per cycle.

ST625:

In a case in which the adjustment threshold value THx is not smaller than "THt2_old−ΔTH", that is, in a case in which the adjustment threshold value THx is not greatly reduced to exceed a reduction width "ΔTH" with respect to the second approach threshold value THt2 in a previous cycle, the threshold value adjustment unit 27 determines the adjustment threshold value THx to be the second approach threshold value THt2 in the current cycle. Accordingly, in a case in which a high noise level "VN" is detected and the adjustment threshold value THx becomes correspondingly a great value exceeding "THt2_old-ΔTH", the threshold value adjustment unit 27 immediately adjusts the second approach threshold value THt2 into a great value according to a change in the second approach threshold value THt2.

ST630:

On the other hand, in a case in which the adjustment threshold value THx is smaller than "THt2_old-ΔTH", that is, in a case in which the adjustment threshold value THx is greatly reduced to exceed the reduction width "ΔTH" with respect to the second approach threshold value THt2 in a previous cycle, the threshold value adjustment unit 27 determines "THt2_old-ΔTH" to be the second approach threshold value THt2 in the current cycle. Accordingly, in a case in which the noise level "VN" is rapidly reduced and the adjustment threshold value THx is correspondingly rapidly reduced to a value smaller than "THt2_old-ΔTH", the threshold value adjustment unit 27 sets a value smaller by "ΔTH" than the second approach threshold value THt2 of the previous cycle to the second approach threshold value THt2 of the current cycle without causing the second approach threshold value THt2 to follow a change thereof. Accordingly, since an increase in the second approach threshold value THt2 is performed at high speed, but a decrease in the second approach threshold value THt2 is performed at low speed, it is possible to prevent an erroneous determination of the approach state due to a fluctuation of the second threshold value THt2 according to a fluctuation of a frequency component of the noise.

As described above, according to the input device of the present embodiment, it is determined whether the object approaches the detection surface on the basis of a result of comparing the threshold value adjusted according to the level of the noise detected in the noise detection unit 25 with the degree-of-approach data 33. Accordingly, even in a case in which a noise component overlaps the degree-of-approach data 33, it is possible to appropriately reduce an error in the determination of the approach state due to the influence of noise since it is determined whether the object approaches using an appropriate threshold value adjusted according to the level of the noise. That is, in a case in which the level of the noise increases, it is possible to reduce a frequency at which the object is erroneously determined to approach the detection surface despite absence of the object since the threshold value is adjusted so that it is difficult for the object to be determined to approach the detection surface. Further, in a case in which the level of noise is low, it is possible to relatively improve the object detection sensitivity since it is relatively easy for the object to be determined to approach the detection surface.

Further, according to the input device of the present embodiment, the threshold value for the determination of the approach state is adjusted according to the number of objects determined to approach the detection surface. Therefore, it can be selected whether to reduce an error of the approach determination of the object due to noise by adjusting the threshold value so that it is difficult for the object to be determined to approach the detection surface or to increase the object detection sensitivity by adjusting the threshold value so that it is easy for the object to be determined to approach the detection surface, according to the number of objects approaching the detection surface. That is, a tradeoff between prevention of an erroneous determination due to noise and object detection sensitivity can be appropriately set according to the number of objects approaching the detection surface.

For example, in the input device according to this embodiment, in a case in which the number of objects approaching the detection surface is equal to or smaller than "1", the threshold value is adjusted so that it is relatively easy for the object to be determined to approach the detection surface. In a case in which the number of objects approaching the detection surface is greater than "1", the threshold value is adjusted so that it is relatively difficult for the object to be determined to approach the detection surface. Accordingly, in a case in which an input operation is performed by a finger approaching the detection surface, when the input operation is performed by one finger, it is relatively easy for the finger to be determined to approach the detection surface. Accordingly, even when an input operation is performed in a state in which the degree of approach to the detection surface is low, it is possible to sensitively input information according to the input operation. On the other hand, since it is relatively difficult for the finger to be determined to approach the detection surface when the input operation is performed using a plurality of fingers, it is difficult for the finger that does not exist to be erroneously determined to approach the detection surface even in a noisy environment, and it is easy to accurately input information according to an input operation using a plurality of fingers.

Further, according to the input device of the present embodiment, a condition that an object in a state "no approach" is determined to be in an state "approach" becomes strict by the threshold value adjustment unit 27 adjusting the second approach threshold value Tht2. Accordingly, it is possible to effectively prevent a object that does not exist from being erroneously determined to be an object in a state "approach" due to an influence of noise. Further, since the first approach threshold value THt1 is not adjusted according to the noise level, it is difficult for the object in a state "approach" to be suddenly determined to be in a state "no approach" due to the influence of the noise. That is, since a range (THt2−THt1) of reserving changing of the determination of the approach state is widened in a case in which the noise level becomes high, it is possible to enhance stability of the determination of the approach state.

Further, according to the input device of the present embodiment, an adjustment width of the threshold value per cycle in a case in which the threshold value adjustment unit 27 performs the adjustment of the threshold value in a direction in which it is easy for the object to be determined to approach the detection surface in the approach determination unit 24 is limited not to exceed a predetermined value (ΔTH). Accordingly, since the adjustment of the threshold value in a direction in which it is difficult for the object to be determined to approach the detection surface is performed at relatively high speed, whereas the adjustment of the threshold value in a reverse direction is performed at relatively low speed, it possible to effectively prevent an erroneous determination of the approach state due to fluctuation of the threshold value according to a fluctuation of frequency components of the noise.

Although several embodiments of the present invention have been described above, the present invention is not limited to the above-described embodiments and includes various variations.

Filter processing for averaging is performed on the degree-of-approach data 33 in the input device according to the first embodiment, and filter processing for averaging is performed on the coordinate data 32 in the input device according to the second embodiment, but the present invention is not limited thereto. In another embodiment of the present invention, filter processing for averaging may be performed on each of the degree-of-approach data 33 and the coordinate data 32. In this case, the temporal response of the filter may be changed according to the noise level 35.

Although the threshold value for the approach determination is adjusted according to the noise level 35 in the third embodiment, the same filtering processing for the degree-of-approach data 33 as that of the input device according to the first embodiment or the same filtering processing for the coordinate data 32 as that of the input device according to the second embodiment may be performed in parallel with the adjustment of the threshold value in other embodiments of the present invention.

In the above-described embodiment, a plurality of objects (for example, fingers) approaching the detection surface can be identified using the identification code i, but the present invention is not limited to this example. That is, the present invention is also applicable to an input device in which the number of identifiable objects is limited to one. In this case, the identification code of the present invention refers to information for identifying a state from approach of one object to the detection surface to being away, and a state in which another object newly approaches the detection surface.

The input device of the embodiment of the present invention is not limited to a user interface device that inputs information using an operation of a finger or the like. That is, the input device of the embodiment of the present invention can be widely applied to devices that input information according to a state of approach of various objects not limited to a human body to the detection surface.

It should be understood by those skilled in the art that various modifications, combinations, sub-combinations and alterations may occur according to design requirements and other factors insofar as they are within the scope of the appended claims or the equivalents thereof.

What is claimed is:

1. An input device for inputting information according to a state of approach of an object approaching thereto, the input device comprising:
    a detection surface to which the object approaches;
    a sensor configured to detect a degree of proximity of the object approaching the detection surface at a plurality of positions of the detection surface;
    a sensor controller configured to control the sensor such that the sensor performs a periodic detection operation, the degree of proximity of the object being detected at the plurality of positions in each cycle of the periodic detection operation;
    a coordinate/proximity data generator configured to generate coordinate data and degree-of-proximity data for each cycle of the periodic detection operation based on a result of the detection in the sensor unit, the coordinate data indicating coordinates of a position of the object approaching the detection surface over a plurality of cycles including a current cycle, and degree-of-proximity data indicating the degree of proximity of the object at the position in the current cycle;
    a noise detector configured to detect noise included in the result of the detection in the sensor; and
    a filter processor configured to perform a predetermined filter processing for each cycle of the periodic detection operation by averaging a series of the degree-of-proximity data of the object obtained over a plurality of cycles so as to generate averaged degree-of-proximity data, or by averaging a series of the coordinate data of the object obtained over a plurality of cycles so as to generate averaged coordinate data,
    wherein the filter processor changes response characteristics of the filter processing according to a level of the noise detected in the noise detector.

2. The input device according to claim 1,
    wherein the filter processor slows a temporal response of the filter processing when the level of the noise detected in the noise detector increases.

3. The input device according to claim 2, further comprising:
    a proximity determiner configured to compare the averaged degree-of-proximity data or the degree-of-proximity data of a plurality of objects with a threshold value in each cycle of the periodic detection operation, and to determine, for each object, whether the object is in proximity of the detection surface based on a result of the comparison,
    wherein the filter processor changes the response characteristics of the filter operation according to a number of the objects which are determined to be in the proximity of the detection surface.

4. The input device according to claim 3,
    wherein the filter processor slows the temporal response of the filter processing when the number of the objects determined to be in the proximity of the detection surface is greater than 1 compared with the temporal response when the number of the objects determined to be in the proximity of the detection surface is equal to or smaller than 1.

5. The input device according to claim 1,
    wherein the filter processor generates the averaged degree-of-proximity data in the current cycle by weighted-averaging the averaged degree-of-proximity data in a previous cycle and the degree-of-proximity data generated by the coordinate/proximity data generator in the current cycle with respective weights.

6. The input device according to claim 1,
    wherein the filter processor generates the averaged coordinate data in the current cycle by weighted-averaging the averaged coordinate data in a previous cycle and the coordinate data generated by the coordinate/proximity data generator in the current cycle with respective weights.

7. An input device for inputting information according to a state of approach of an object approaching thereto, the input device comprising:
    a detection surface to which the object approaches;
    a sensor configured to detect a degree of proximity of the object approaching the detection surface at a plurality of positions of the detection surface;
    a sensor controller configured to control the sensor such that the sensor performs a periodic detection operation, the degree of proximity of the object being detected at the plurality of positions in each cycle of the periodic detection operation;
    a coordinate/proximity data generator configured to generate coordinate data and degree-of-proximity data for each cycle of the periodic detection operation based on a result of the detection in the sensor unit, the coordinate data indicating coordinates of a position of the object approaching the detection surface over a plurality of cycles including a current cycle, and the degree-of-proximity data indicating the degree of proximity of the object at the position in the current cycle;

a noise detector configured to detect noise included in the result of the detection in the sensor;

a proximity determiner configured to compare the degree-of-proximity data of a plurality of objects with a threshold value in each cycle of the periodic detection operation, and to determine, for each object, whether the object is in proximity of the detection surface based on a result of the comparison; and a threshold value adjuster configured to adjust the threshold value according to a level of the noise detected in the noise detector.

8. The input device according to claim 7, wherein the threshold value adjuster adjusts the threshold value such that the proximity determiner tends not to determine the object to be in the proximity of the detection surface as the level of the noise detected in the noise detector increases.

9. The input device according to claim 8, wherein the threshold value adjuster adjusts the threshold value according to a number of objects which are determined to be in the proximity of the detection surface.

10. The input device according to claim 7, wherein the threshold value adjuster adjusts the threshold value such that the proximity determiner tends not to determine the object to be in the proximity of the detection surface when a number of objects determined to be in the proximity of the detection surface is greater than 1, compared with the threshold value when the number of the objects is equal to or smaller than 1.

11. A method of controlling an input device for inputting information according to a state of approach of an object, the input device including a detection surface to which the object approaches and a sensor for detecting a degree of proximity of the object at a plurality of positions of the detection surface, the method comprising the steps of:

controlling the sensor such that the sensor performs a periodic detection operation, the degree of proximity of the object being detected at the plurality of positions in each cycle of the periodic detection operation;

generating coordinate data and degree-of-proximity data for each cycle of the periodic detection operation based on a result of the detection of the sensor, the coordinate data indicating coordinates of a position of the object approaching the detection surface over a plurality of cycles including a current cycle, and the degree-of-proximity data indicating the degree of proximity of the object at the position in the current cycle;

detecting noise included in the result of the detection in the sensor; and performing a predetermined filter processing for each cycle of the periodic detection operation by averaging a series of degree-of-proximity data of the object obtained over a plurality of cycles so as to generate averaged degree-of-proximity data, or averaging a series of coordinate data of the object obtained over a plurality of cycles so as to generate averaged coordinate data, wherein the step of performing the predetermined filter processing includes changing response characteristics of the filter processing according to a level of the noise detected in the step of detecting the noise.

12. The method of controlling an input device according to claim 11, further comprising the step of:

comparing the averaged degree-of-proximity of a plurality of objects with a threshold value in each cycle of the periodic detection operation, and determining, for each object, whether the object is in proximity of the detection surface based on a result of the comparison, wherein the step of performing the predetermined filter processing further includes changing the response characteristics according to a number of objects determined to be in the proximity of the detection surface.

13. A non-transitory computer-readable storage medium with an executable program stored thereon, the program causing a computer to execute the method of controlling an input device according to claim 11.

14. A method of controlling an input device for inputting information according to a state of approach of an object, the input device including a detection surface to which the object approaches and a sensor for detecting a degree of proximity of the object at a plurality of positions of the detection surface, the method comprising the steps of:

controlling the sensor such that the sensor performs a periodic detection operation, the degree of proximity of the object being detected at the plurality of positions in each cycle of the periodic detection operation;

generating coordinate data and degree-of-proximity data for each cycle of the periodic detection operation based on a result of the detection of the sensor, the coordinate data indicating coordinates of a position of the object approaching the detection surface over a plurality of cycles, and the degree-of-proximity data indicating the degree of proximity of the object at the position in the current cycle;

detecting noise included in the result of the detection of the sensor;

comparing the degree-of-proximity data of a plurality of objects with a threshold value in each cycle of the periodic detection operation, and determining, for each object, whether the object is in proximity of the detection surface based on a result of the comparison; and adjusting the threshold value according to a level of the noise detected in the step of detecting the noise.

15. The method of controlling an input device according to claim 14, wherein the step of adjusting the threshold value includes adjusting the threshold value according to a number of objects which are determined to be in the proximity of the detection surface.

\* \* \* \* \*